(12) United States Patent
Fleureau et al.

(10) Patent No.: US 11,178,383 B2
(45) Date of Patent: Nov. 16, 2021

(54) METHOD, APPARATUS AND STREAM FOR VOLUMETRIC VIDEO FORMAT

(71) Applicant: InterDigital VC Holdings, Inc., Wilmington, DE (US)

(72) Inventors: Julien Fleureau, Cesson-Sevigne (FR); Bertrand Chupeau, Cesson-Sevigne (FR); Thierry Tapie, Cesson-Sevigne (FR); Franck Thudor, Cesson-Sevigne (FR)

(73) Assignee: InterDigital VC Holdings, Inc., Wilmington, DE (US)

(*) Notice: Subject to any disclaimer, the term of this patent is extended or adjusted under 35 U.S.C. 154(b) by 0 days.

(21) Appl. No.: 17/043,504

(22) PCT Filed: Mar. 27, 2019

(86) PCT No.: PCT/US2019/024245
§ 371 (c)(1),
(2) Date: Sep. 30, 2020

(87) PCT Pub. No.: WO2019/191205
PCT Pub. Date: Oct. 3, 2019

(65) Prior Publication Data
US 2021/0112236 A1 Apr. 15, 2021

(30) Foreign Application Priority Data

Mar. 30, 2018 (EP) ..................................... 18305372

(51) Int. Cl.
*H04N 13/275* (2018.01)
*H04N 13/117* (2018.01)
(Continued)

(52) U.S. Cl.
CPC ......... *H04N 13/275* (2018.05); *H04N 13/117* (2018.05); *H04N 13/161* (2018.05); *H04N 13/194* (2018.05); *H04N 13/282* (2018.05)

(58) Field of Classification Search
None
See application file for complete search history.

(56) References Cited

U.S. PATENT DOCUMENTS

2017/0347084 A1* 11/2017 Boyce ..................... G06F 3/013
2018/0035134 A1*  2/2018 Pang .................... H04N 13/194

FOREIGN PATENT DOCUMENTS

WO    WO 2018050529 A1    3/2018

OTHER PUBLICATIONS

Anonymous, "PCC Test Model Category 2 v.0", International Organization for Standardization, ISO/IEC JTC1/SC29/WG11, Coding of Moving Pictures and Audio, Document N17248, Macau, China, Oct. 2017, 11 pages.
(Continued)

*Primary Examiner* — Christopher Braniff
(74) *Attorney, Agent, or Firm* — Condo Roccia Koptiw LLP

(57) ABSTRACT

Methods and device for encoding/decoding data representative of a 3D scene. First data representative of texture of the 3D scene visible from a first viewpoint is encoded into first tracks. The first data is arranged in first tiles of a first frame. Second data representative of depth associated with points of the 3D scene is encoded into second tracks. The second data is arranged in second tiles of a second frame, the total number of second tiles being greater than the total number of first tiles. Instructions to extract at least a part of the first data and second data from at least a part of the at least a first track and at least a second track are further encoded into one or more third tracks.

23 Claims, 11 Drawing Sheets

(51) Int. Cl.
*H04N 13/194* (2018.01)
*H04N 13/161* (2018.01)
*H04N 13/282* (2018.01)

(56) References Cited

OTHER PUBLICATIONS

Misra et al., "An Overview of Tiles in HEVC", IEEE Journal of Selected Topics in Signal Processing, vol. 7, No. 6, Dec. 2013, pp. 969-977.

Sanchez et al., "Profiles under Considerations for ISO/IEC 23000-20 Omnidirectional Media Format", International Organization for Standardization ISO/IEC JTC1/SC29/WG11, Coding of Moving Pictures and Audio, Document N16952, Torino, Italy, Jul. 2017, 54 pages.

Guede et al., "Geometry Image Coding Improvements", International Organization for Standardization, ISO/IEC JTC1/SC29/WG11, Coding of Moving Pictures and Audio, Document MPEG/M42111, Gwangju, Korea, Jan. 2018, 15 pages.

Jylanki, J., "A Thousand Ways to Pack the Bin—A Practical Approach to Two-Dimensional Rectangle Bin Packing", http://clb.demon.fi/files/RectangleBinPack.pdf, Feb. 27, 2010, pp. 1-50.

Wang et al., "Enhanced Support of HEVC and MVC+D", International Organization for Standardization, ISO/IEC JTC1/SC29/WG11, Coding of Moving Pictures and Audio, Document w14123, San Jose, California, US, Jan. 2014, 147 pages.

Sullivan et al., "Overview of the High Efficiency Video Coding (HEVC) Standard", IEEE Transactions on Circuits and Systems for Video Technology, vol. 22, No. 12, Dec. 2012, pp. 1649-1668.

Skupin et al., "Tile Based HEVC Video for Head Mounted Displays", 2016 EEE International Symposium on Multimedia, San José, California, USA, Dec. 11, 2016, pp. 399-400.

* cited by examiner 3A   3B   3C

METHOD, APPARATUS AND STREAM FOR VOLUMETRIC VIDEO FORMAT

This application claims the benefit, under 35 U.S.C. § 365 of International Application PCT/US2019/024245, filed Mar. 27, 2019, which was published in accordance with PCT Article 21(2) on Oct. 3, 2019, in English, and which claims the benefit of European Patent Application No. 18305372.7, filed Mar. 30, 2018.

1. TECHNICAL FIELD

The present disclosure relates to the domain of volumetric video content. The present disclosure is also understood in the context of the encoding and/or the formatting of the data representative of the volumetric content, for example for the rendering on end-user devices such as mobile devices or Head-Mounted Displays.

2. BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present invention. Accordingly, these statements are to be read in this light, and not as admissions of prior art.

Recently there has been a growth of available large field-of-view content (up to 360°). Such content is potentially not fully visible by a user watching the content on immersive display devices such as Head Mounted Displays, smart glasses, PC screens, tablets, smartphones and the like. That means that at a given moment, a user may only be viewing a part of the content. However, a user can typically navigate within the content by various means such as head movement, mouse movement, touch screen, voice and the like. It is typically desirable to encode and decode this content.

Immersive video, also called 360° flat video, allows the user to watch all around himself through rotations of his head around a still point of view. Rotations only allow a 3 Degrees of Freedom (3 DoF) experience. Even if 3 DoF video is sufficient for a first omnidirectional video experience, for example using a Head-Mounted Display device (HMD), 3 DoF video may quickly become frustrating for the viewer who would expect more freedom, for example by experiencing parallax. In addition, 3 DoF may also induce dizziness because of a user never only rotates his head but also translates his head in three directions, translations which are not reproduced in 3 DoF video experiences.

A large field-of-view content may be, among others, a three-dimension computer graphic imagery scene (3D CGI scene), a point cloud or an immersive video. Many terms might be used to design such immersive videos: Virtual Reality (VR), 360, panoramic, 4π steradians, immersive, omnidirectional or large field of view for example.

Volumetric video (also known as 6 Degrees of Freedom (6 DoF) video) is an alternative to 3 DoF video. When watching a 6 DoF video, in addition to rotations, the user can also translate his head, and even his body, within the watched content and experience parallax and even volumes. Such videos considerably increase the feeling of immersion and the perception of the scene depth and prevent from dizziness by providing consistent visual feedback during head translations. The content is created by the means of dedicated sensors allowing the simultaneous recording of color and depth of the scene of interest. The use of rig of color cameras combined with photogrammetry techniques is a common way to perform such a recording.

While 3 DoF videos comprise a sequence of images resulting from the un-mapping of texture images (e.g. spherical images encoded according to latitude/longitude projection mapping or equirectangular projection mapping), 6 DoF video frames embed information from several points of views. They can be viewed as a temporal series of point clouds resulting from a three-dimension capture. Two kinds of volumetric videos may be considered depending on the viewing conditions. A first one (i.e. complete 6 DoF) allows a complete free navigation within the video content whereas a second one (aka. 3 DoF+) restricts the user viewing space to a limited volume, allowing limited translation of the head and parallax experience. This second context is a valuable trade-off between free navigation and passive viewing conditions of a seated audience member.

3 DoF videos may be encoded in a stream as a sequence of rectangular color images generated according to a chosen projection mapping (e.g. cubical projection mapping, pyramidal projection mapping or equirectangular projection mapping). This encoding has the advantage to make use of standard image and video processing standards. 3 DoF+ and 6 DoF videos require additional data to encode the depth of colored points of point clouds. The kind of rendering (i.e. 3 DoF or volumetric rendering) for a volumetric scene is not known a priori when encoding the scene in a stream. Up to date, streams are encoded for one kind of rendering or the other. There is a lack of a stream, and associated methods and devices, that can carry data representative of a volumetric scene that can be encoded at once and decoded either as a 3 DoF video or as a volumetric video (3 DoF+ or 6 DoF).

Moreover, the amount of data to be transported for e.g. the rendering on end-user devices may be very important, increasing significantly the needs in bandwidth over networks.

3. SUMMARY

References in the specification to "one embodiment", "an embodiment", "an example embodiment", "a particular embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present disclosure relates to a method of encoding data representative of a 3D scene, the method comprising:
  encoding, into at least a first track, first data representative of texture of the 3D scene visible according to a first viewpoint, the first data being arranged in a plurality of first tiles of a first frame, a part of the 3D scene being associated with each first tile of the plurality of first tiles;
  encoding, into at least a second track, second data representative of depth associated with points of the 3D scene, the second data being arranged in a plurality of second tiles of a second frame, wherein the total number of second tiles of the second frame being greater than the total number of first tiles of the first frame, wherein for each first tile of at least a part of the plurality of first tiles:

a set of second tiles comprising at least one second tile of the plurality of second tiles is allocated to each first tile of at least a part of the plurality of first tiles;

a set of at least a patch is arranged in the set of second tiles, each patch corresponding to a two-dimensional parametrization of a group of 3D points comprised into the part of the 3D scene associated with each first tile and comprising second data representative of depth associated with the 3D points of the group;

encoding, into at least a third track, at least an instruction to extract at least a part of the first data and second data from at least a part of the at least a first track and at least a second track.

The present disclosure relates to a device configured to encode data representative of a 3D scene, the device comprising a memory associated with at least one processor configured to:

encode, into at least a first track, first data representative of texture of the 3D scene visible according to a first viewpoint, the first data being arranged in a plurality of first tiles of a first frame, a part of the 3D scene being associated with each first tile of the plurality of first tiles;

encode, into at least a second track, second data representative of depth associated with points of the 3D scene, the second data being arranged in a plurality of second tiles of a second frame, wherein the total number of second tiles of the second frame being greater than the total number of first tiles of the first frame, wherein for each first tile of at least a part of the plurality of first tiles:

a set of second tiles comprising at least one second tile of the plurality of second tiles is allocated to each first tile of at least a part of the plurality of first tiles;

a set of at least a patch is arranged in the set of second tiles, each patch corresponding to a two-dimensional parametrization of a group of 3D points comprised into the part of the 3D scene associated with each first tile and comprising second data representative of depth associated with the 3D points of the group;

encode, into at least a third track, at least an instruction to extract at least a part of the first data and second data from at least a part of the at least a first track and at least a second track.

The present disclosure relates to a device configured to encode data representative of a 3D scene, the device comprising:

an encoder configured to encode, into at least a first track, first data representative of texture of the 3D scene visible according to a first viewpoint, the first data being arranged in a plurality of first tiles of a first frame, a part of the 3D scene being associated with each first tile of the plurality of first tiles;

an encoder configured to encode, into at least a second track, second data representative of depth associated with points of the 3D scene, the second data being arranged in a plurality of second tiles of a second frame, wherein the total number of second tiles of the second frame being greater than the total number of first tiles of the first frame, wherein for each first tile of at least a part of the plurality of first tiles:

a set of second tiles comprising at least one second tile of the plurality of second tiles is allocated to each first tile of at least a part of the plurality of first tiles;

a set of at least a patch is arranged in the set of second tiles, each patch corresponding to a two-dimensional parametrization of a group of 3D points comprised into the part of the 3D scene associated with each first tile and comprising second data representative of depth associated with the 3D points of the group;

an encoder configured to encode, into at least a third track, at least an instruction to extract at least a part of the first data and second data from at least a part of the at least a first track and at least a second track.

The present disclosure relates to a device configured to encode data representative of a 3D scene, the device comprising:

means for encoding, into at least a first track, first data representative of texture of the 3D scene visible according to a first viewpoint, the first data being arranged in a plurality of first tiles of a first frame, a part of the 3D scene being associated with each first tile of the plurality of first tiles;

means for encoding, into at least a second track, second data representative of depth associated with points of the 3D scene, the second data being arranged in a plurality of second tiles of a second frame, wherein the total number of second tiles of the second frame being greater than the total number of first tiles of the first frame, wherein for each first tile of at least a part of the plurality of first tiles:

a set of second tiles comprising at least one second tile of the plurality of second tiles is allocated to each first tile of at least a part of the plurality of first tiles;

a set of at least a patch is arranged in the set of second tiles, each patch corresponding to a two-dimensional parametrization of a group of 3D points comprised into the part of the 3D scene associated with each first tile and comprising second data representative of depth associated with the 3D points of the group;

means for encoding, into at least a third track, at least an instruction to extract at least a part of the first data and second data from at least a part of the at least a first track and at least a second track.

According to a particular characteristic, each patch further comprises third data representative of texture associated with the 3D points of the group, the third data being encoded into the at least a second track.

According to a specific characteristic, a set of third tiles of a third frame comprising at least one third tile is allocated to each first tile and a set of at least a patch comprising third data representative of texture associated with the 3D points of the group is arranged in the set of third tiles, the at least a patch corresponding to the two-dimensional parametrization of the group of 3D points, the third data being encoded into at least a third track.

According to another specific characteristic, when a size of a patch of the set is greater than a size of a second tile into which the patch is to be arranged, then the patch is partitioned into a plurality of sub-patches having each a size less than the size of the second tile.

According to a further specific characteristic, patches of the set are arranged with a priority order depending on a visual importance of the patches, the visual importance depending from the second data associated with the patches.

According to a further specific characteristic, the second tiles have a same size that is fixed for a plurality of temporally successive second frames.

The present disclosure relates to a method of decoding data representative of a 3D scene, the method comprising:
- decoding, from at least a third track, at least an instruction to extract first data and second data from at least a first track and at least a second track;
- decoding the first data from the at least a first track, the first data being representative of texture of the 3D scene visible according to a first viewpoint, the first data being arranged in a plurality of first tiles of a first frame, a part of the 3D scene being associated with each first tile of the plurality of first tiles;
- decoding the second data from the at least a second track, the second data being representative of depth associated with points of the 3D scene, the second data representative of depth being comprised in at least a patch arranged in at least a set of second tiles of a second frame, a set of second tiles being allocated to each first tile, the at least a patch corresponding to a two-dimensional parametrization of a group of 3D points comprised into the at least a part of the 3D scene associated with each first tile, the second data being representative of depth associated with the 3D points of the group.

The present disclosure relates to a device configured to decode data representative of a 3D scene, the device comprising a memory associated with at least one processor configured to:
- decode, from at least a third track, at least an instruction to extract first data and second data from at least a first track and at least a second track;
- decode the first data from the at least a first track, the first data being representative of texture of the 3D scene visible according to a first viewpoint, the first data being arranged in a plurality of first tiles of a first frame, a part of the 3D scene being associated with each first tile of the plurality of first tiles;
- decode the second data from the at least a second track, the second data being representative of depth associated with points of the 3D scene, the second data representative of depth being comprised in at least a patch arranged in at least a set of second tiles of a second frame, a set of second tiles being allocated to each first tile, the at least a patch corresponding to a two-dimensional parametrization of a group of 3D points comprised into the at least a part of the 3D scene associated with each first tile, the second data being representative of depth associated with the 3D points of the group.

The present disclosure relates to a device configured to decode data representative of a 3D scene, the device comprising:
- a decoder configured to decode, from at least a third track, at least an instruction to extract first data and second data from at least a first track and at least a second track;
- a decoder configured to decode the first data from the at least a first track, the first data being representative of texture of the 3D scene visible according to a first viewpoint, the first data being arranged in a plurality of first tiles of a first frame, a part of the 3D scene being associated with each first tile of the plurality of first tiles;
- a decoder configured to decode the second data from the at least a second track, the second data being representative of depth associated with points of the 3D scene, the second data representative of depth being comprised in at least a patch arranged in at least a set of second tiles of a second frame, a set of second tiles being allocated to each first tile, the at least a patch corresponding to a two-dimensional parametrization of a group of 3D points comprised into the at least a part of the 3D scene associated with each first tile, the second data being representative of depth associated with the 3D points of the group.

The present disclosure relates to a device configured to decode data representative of a 3D scene, the device comprising:
- means for decoding, from at least a third track, at least an instruction to extract first data and second data from at least a first track and at least a second track;
- means for decoding the first data from the at least a first track, the first data being representative of texture of the 3D scene visible according to a first viewpoint, the first data being arranged in a plurality of first tiles of a first frame, a part of the 3D scene being associated with each first tile of the plurality of first tiles;
- means for decoding the second data from the at least a second track, the second data being representative of depth associated with points of the 3D scene, the second data representative of depth being comprised in at least a patch arranged in at least a set of second tiles of a second frame, a set of second tiles being allocated to each first tile, the at least a patch corresponding to a two-dimensional parametrization of a group of 3D points comprised into the at least a part of the 3D scene associated with each first tile, the second data being representative of depth associated with the 3D points of the group.

According to a particular characteristic, third data representative of texture associated with the 3D points of the group comprised in each patch is further decoded from the at least a second track.

According to a specific characteristic, third data representative of texture is further decoded from at least a third track, the third data being arranged into a plurality of third tiles of a third frame, a set of third tiles comprising at least one third tile being allocated to each first tile, a set of at least a patch comprising third data associated with the 3D points of the group being arranged in the set of third tiles, the at least a patch corresponding to the two-dimensional parametrization of the group of 3D points.

According to another characteristic, at least a part of the 3D scene is rendered according to the first and second data.

The present disclosure also relates to a bitstream carrying data representative of a 3D scene, the data comprising, in at least a first syntax element, first data representative of texture of the 3D scene visible according to a first viewpoint, the first data being associated with a plurality of first tiles of a first frame, a part of the 3D scene being associated with each first tile of the plurality of first tiles; in at least a second syntax element, second data representative of depth associated with points of the 3D scene, the second data being associated with a plurality of second tiles of a second frame, the total number of second tiles of the second frame being greater than the total number of first tiles of the first frame, a set of second tiles comprising at least one second tile being allocated to said each first tile, a set of at least a patch being arranged in the set of second tiles, each patch corresponding to a two-dimensional parametrization of a group of 3D points comprised into the part of the 3D scene associated with each first tile and comprising second data representative of depth associated with the 3D points of the group; the bitstream further carrying in at least a third syntax element at least an instruction to extract at least a part of the first data and second data.

The present disclosure also relates to a computer program product comprising program code instructions to execute the steps of the method of encoding or decoding data representative of a 3D scene, when this program is executed on a computer.

The present disclosure also relates to a (non-transitory) processor readable medium having stored therein instructions for causing a processor to perform at least the above-mentioned method of encoding or decoding data representative of a 3D scene.

4. LIST OF FIGURES

The present disclosure will be better understood, and other specific features and advantages will emerge upon reading the following description, the description making reference to the annexed drawings wherein.

5. DETAILED DESCRIPTION OF EMBODIMENTS

Figure 1:
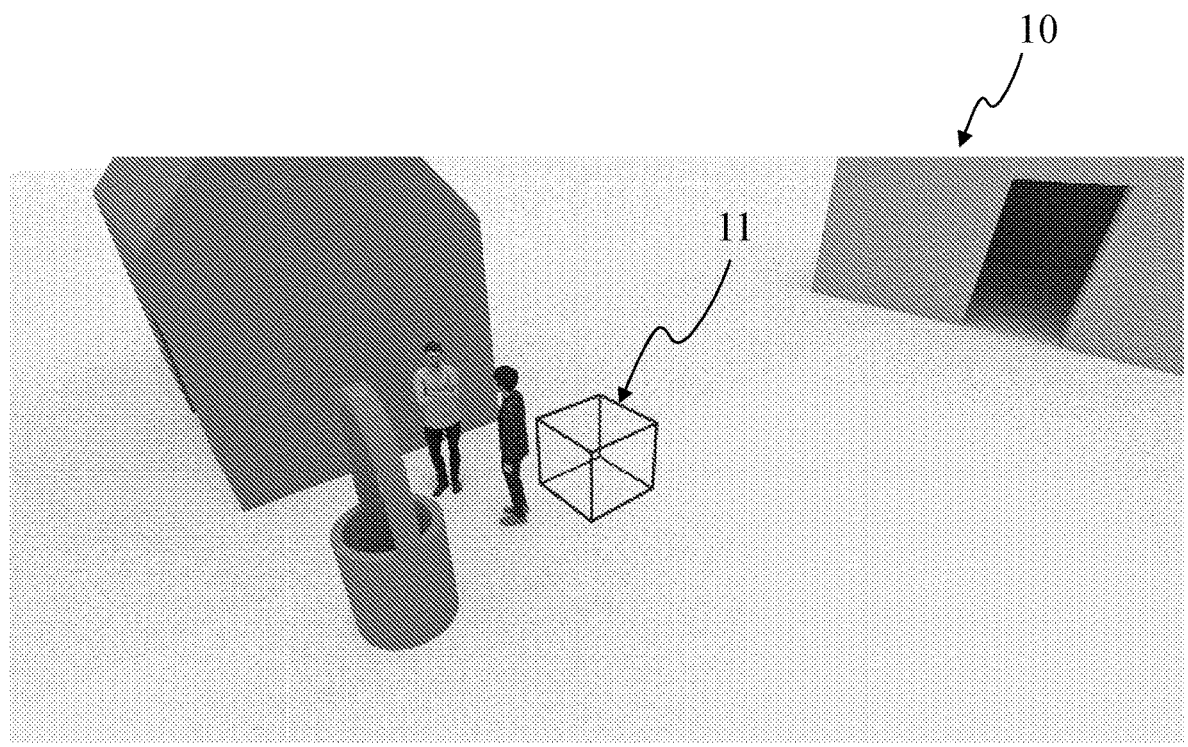
FIG. 1 shows an image representing a three-dimension scene comprising a surface representation of several objects, according to a non-restrictive embodiment of the present principles.

The subject matter is now described with reference to the drawings, wherein like reference numerals are used to refer to like elements throughout. In the following description, for purposes of explanation, numerous specific details are set forth in order to provide a thorough understanding of the subject matter. It can be evident, however, that subject matter embodiments can be practiced without these specific details.

The present description illustrates the principles of the present disclosure. It will thus be appreciated that those skilled in the art will be able to devise various arrangements that, although not explicitly described or shown herein, embody the principles of the disclosure.

According to non-limitative embodiments of the present disclosure, methods and devices to encode images of a volumetric video (also called 3 DoF+ or 6 DoF video), for example in one or more frames, in a container and/or in a bitstream, are disclosed. Methods and devices to decode images of a volumetric video from a stream and/or frames are also disclosed. Examples of the syntax of a bitstream for the encoding of one or more images/frames of a volumetric video are also disclosed.

According to a non-limitative aspect, the present principles will be described in reference to a first particular embodiment of a method of (and a device configured for) encoding data representative of a 3D scene (represented with a volumetric content, also called immersive video) into one or more frames of a container and/or a bitstream.

To reach that aim, first data representative of the texture (e.g. color information associated with the elements, e.g. points, of the 3D scene) of the 3D scene visible according to a first viewpoint is encoded into one or more first tracks associated with at least a part of the first tiles of a first frame. The first data corresponds to the texture information of a 3 DoF view/image of the scene, i.e. a view of the scene according to a central viewpoint with only texture and no geometric (i.e. depth or 3D information), i.e. a "flat" view/image of the 3D scene. The first frame is partitioned into a plurality of first tiles (a tile corresponding to a sub area of the frame and is for example defined in HEVC standard (High Efficiency Video Coding) or in VP9 of google with different acronym(s)), a part of the 3D scene being associated with each first tile of the first frame.

A second frame is partitioned into a plurality of second tiles, the total number of second tiles being greater than the total number of first tiles of the first frame. For at least a part of the first tiles, a set of second tiles is allocated to each first tile. Regarding each first tile, patches of the part of the 3D scene corresponding to each first tile are arranged in the allocated second tiles. A patch corresponds to a two-dimensional (2D) parametrization of a 3D part of the scene and comprises at least second data representative of depth of at least some points comprised in the 3D part.

The second data is encoded in the one or more second tracks associated with the second tiles.

Instructions adapted to extract at least a part of the first data (from at least a part of the first tracks) and at least a part of the second data (from at least a part of the second tracks) is encoded into one or more third tracks.

A 2D parametrization of a 3D part of the 3D scene corresponds to a 2D representation of the 3D part (e.g. of the points of the 3D scene comprised in the 3D part). A 2D parametrization may be obtained in various ways, as it will be explained with more details in the description.

A frame corresponds to an image (e.g. of a sequence of temporally successive still images forming a video) and corresponds to an array of pixels, attributes (e.g. depth information and/or texture information) being associated with the pixels of the frame.

A corresponding method of (and a device configured for) decoding data representative of the 3D scene is also described with regard to the non-limitative aspect of the present principles.

FIG. 1 shows an image representing a three-dimensional (3D) scene 10 comprising a surface representation of several objects. The scene may have been acquired using any suitable technology. For example, it may have been created using computer graphics interface (CGI) tools. It may have been acquired with color and depth image acquisition devices. In such a case, it is possible that one or more parts of the objects that are not visible from the acquisition devices (e.g. cameras) may not be represented in the scene as described in relation to FIG. 2. The example scene illustrated in FIG. 1 comprises houses, two characters and a well. The cube 11 illustrates a space of view from which a user is likely to observe the 3D scene. The space of view 11 is for example centred on a first viewpoint. The 3D scene (or part of it) may for example be represented with a flat image (or a flat video, also called omnidirectional image/video) representing the 3D scene according to the first viewpoint and enabling a user (e.g. wearing a HMD) to browse into the scene according to 3 degrees of freedom (3 Dof), i.e. with rotations around the roll, yaw and pitch axis. The 3D scene (or further parts of the 3D scene) may be represented with additional data (in addition to the texture/color data of the flat image) associated with the parts of the 3D scene viewed from the viewpoints of the cube 11 excepting the first view point for the texture data. The additional data may for example comprise one or any combination of the following information:

depth information associated with the points of the 3D scene viewed from the first viewpoint;

depth information associated with parts of the 3D scene viewed from the viewpoints of the cube 11 but the first viewpoint;

texture information (also called color information) associated with parts of the 3D scene viewed from the viewpoints of the cube 11 but the first viewpoint.

The additional data in combination with the flat video enables a 3 DoF+ and/or a 6 DoF browsing into the representation of the 3D scene.

Figure 2:
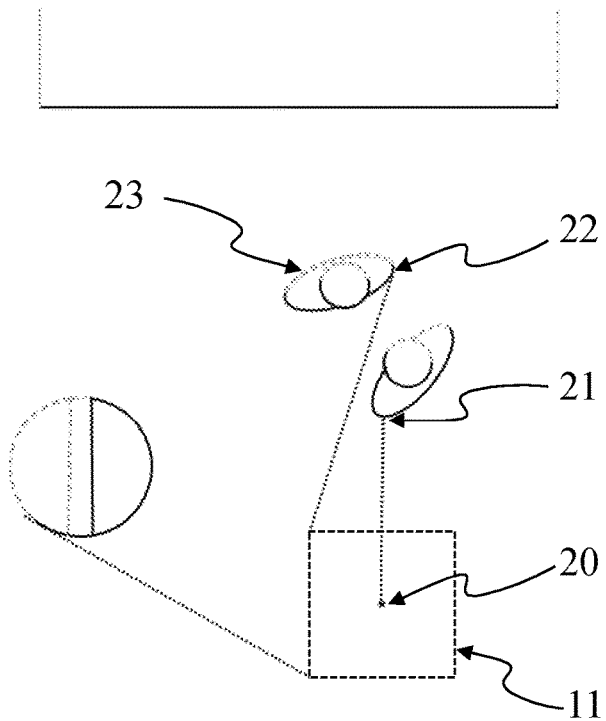
FIG. 2 illustrates an example arrangement of points of view on the scene of FIG. 1 and visible points of this scene from different points of view of this arrangement, according to a non-restrictive embodiment of the present principles.

FIG. 2 shows an example arrangement of points of view on a scene, e.g. the 3D scene 10 of FIG. 1. FIG. 2 also shows the points of this 3D scene 10 that are visible from/according to the different points of view of this arrangement. To be rendered and displayed by an immersive rendering device (e.g. a cave or a Head Mounted Display device (HMD)), a 3D scene is considered from a first viewpoint (also called first point of view), for example the first view point 20. Point 21 of the scene, corresponding to the right elbow of the first character is visible from the first point of view 20, as there is not any opaque object laying between the first point of view 20 and the scene point 21. In contrast, the point 22 of the 3D scene 10, which corresponds for example to the left elbow of the second character, is not visible from the first point of view 20, as it is occluded by points of the first character.

For 3 DoF rendering, only one point of view, for example the first viewpoint 20, is considered. The user may rotate his head in three degrees of freedom around the first point of view to watch various parts of the 3D scene, but the user cannot move the first viewpoint. Points of the scene to be encoded in the stream are points which are visible from this first point of view. There is no need to encode points of the scene that are not visible from this first point of view as the user cannot access to them by moving the first viewpoint.

With regard to 6 DoF rendering, the user may move the viewpoint everywhere in the scene. In this case, it is valuable to encode every point of the scene in the content bitstream as every point is potentially accessible by a user who can move his/her point of view. At the encoding stage, there is no means to know, a priori, from which point of view the user will observe the 3D scene 10.

With regard to 3 DoF+ rendering, the user may move the point of view within a limited space around a point of view, for example around the first viewpoint 20. For example, the user may move his point of view within a cube 11 centered on the first viewpoint 20. This enables to experience parallax as illustrated in relation to FIG. 3. Data representative of the part of the scene visible from any point of the space of view, for example the cube 11, is to be encoded into the stream, including the data representative of the 3D scene visible according to the first viewpoint 20. The size and shape of the space of view may for example be decided and determined at the encoding step and encoded in the bitstream. The decoder may obtain this information from the bitstream and the renderer limits the space of view to the space determined by the obtained information. According to another example, the renderer determines the space of view according to hardware constraints, for example in relation to capabilities of the sensor(s) that detects the movements of the user. In such a case, if, at the encoding phase, a point visible from a point within the space of view of the renderer has not been encoded in the bitstream, this point will not be rendered. According to a further example, data (e.g. texture and/or geometry) representative of every point of the 3D scene is encoded in the stream without considering the rendering space of view. To optimize the size of the stream, only a subset of the points of the scene may be encoded, for instance the subset of points that may be seen according to a rendering space of view.

Figure 3:
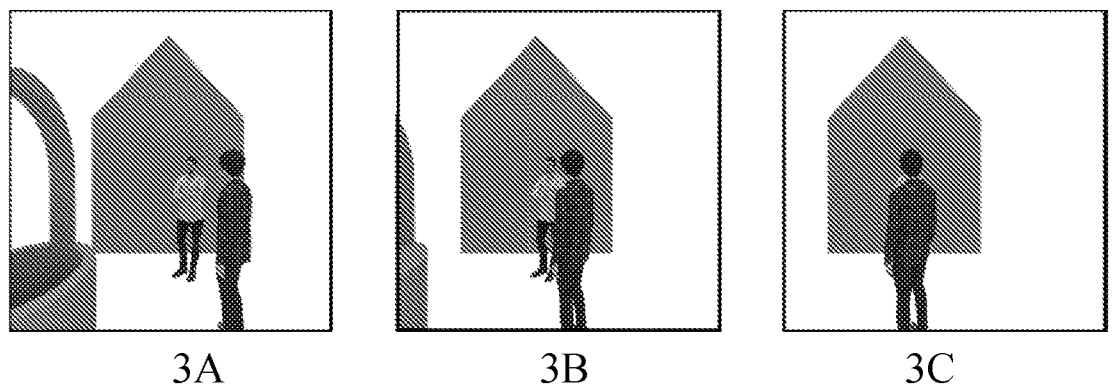
FIG. 3 illustrates the parallax experience by showing different views of the scene of FIG. 1 according to the point of view of FIG. 2, according to a non-restrictive embodiment of the present principles.

FIG. 3 illustrates the parallax experience that is allowed by volumetric (i.e. 3 DoF+ and 6 DoF) rendering. FIG. 3B illustrates the part of the scene a user could see from the first viewpoint 20 of FIG. 2. From this first viewpoint 20, the two characters are in a given spatial configuration, for example, the left elbow of the second character (with a white shirt) is hidden by the body of the first character while his head is visible. When the user is rotating his/her head according to the three degrees of freedom around the first viewpoint 20, this configuration does not change. If the viewpoint is fixed, the left elbow of the second character is not visible. FIG. 3A illustrates the same part of the scene seen from a viewpoint located at the left side of the space of view 11 of FIG. 2. From such a viewpoint, the point 22 of FIG. 2 is visible due to the parallax effect. Therefore, for a volumetric rendering, the point 22 should be encoded into the stream. If not encoded, this point 22 will not be rendered. FIG. 3C illustrates the same part of the scene observed from a viewpoint located at the right side of the space of view 11 of FIG. 3. From this viewpoint, the second character is almost entirely hidden by the first character.

By moving the viewpoint within the 3D scene, the user may experience the parallax effect.

Figure 4:
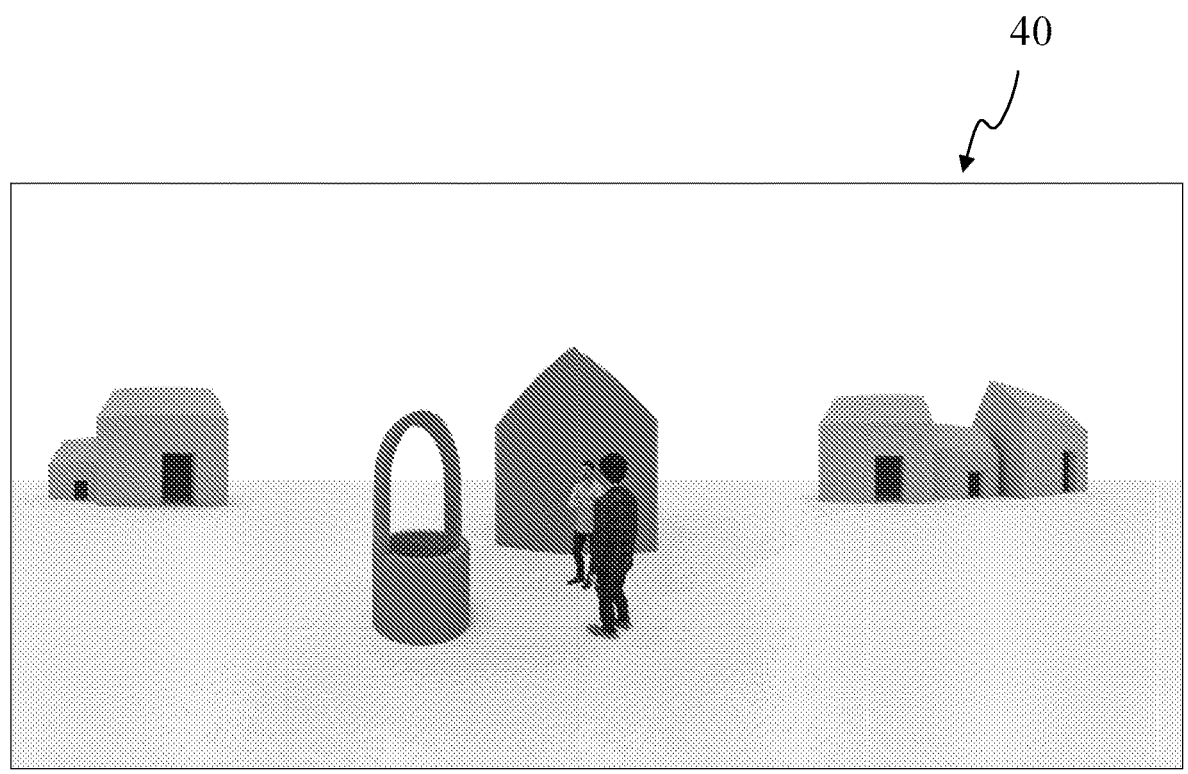
FIG. 4 shows a texture image of the points of the scene of FIG. 1 visible from the point of view of FIG. 2 according to an equirectangular projection mapping, according to a non-restrictive embodiment of the present principles.

FIG. 4 shows a texture image 40 (also called color image) comprising the texture information (e.g. RGB data or YUV data) of the points of the 3D scene 10 that are visible from the first viewpoint 20 of FIG. 2, this texture information being obtained according to an equirectangular projection mapping. Equirectangular projection mapping is an example of spherical projection mapping.

Figure 5:
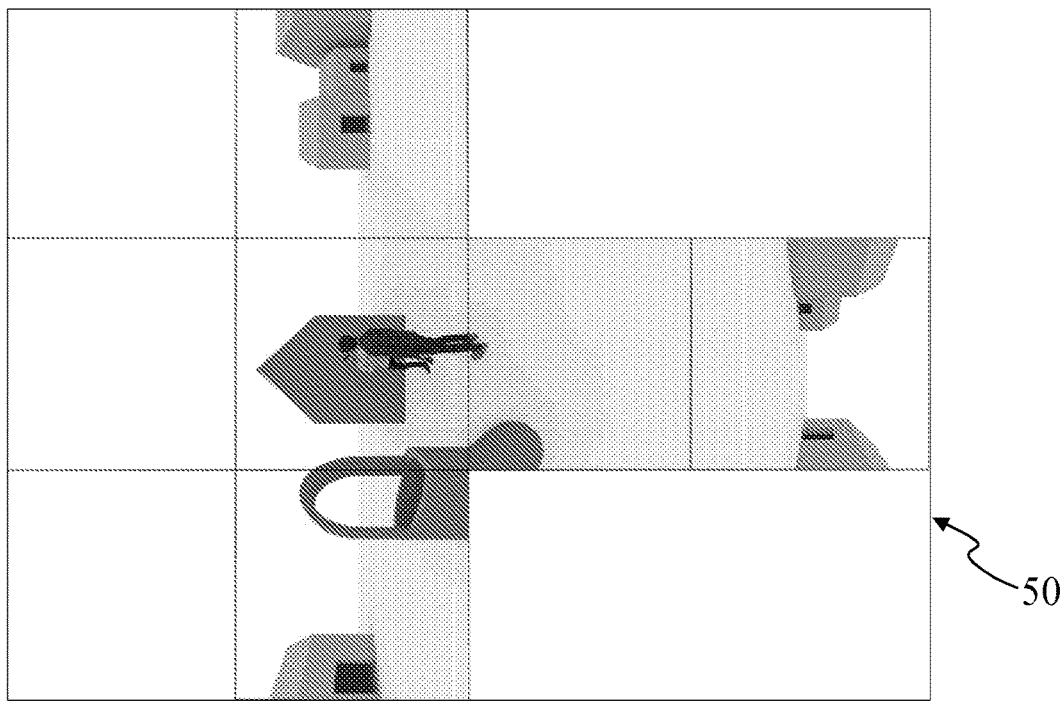
FIG. 5 shows an image of the same points of the scene as in FIG. 4 represented with a cubical projection mapping, according to a non-restrictive embodiment of the present principles.

FIG. 5 shows an image 50 of the points of the 3D scene obtained or encoded according to a cubical projection mapping. There are different cubical projection mappings. For example, faces of the cube may be arranged differently in the image 50 of FIG. 5 and/or faces may be oriented another way.

The projection mapping used to obtain/encode points of the scene visible from a determined viewpoint is selected, for example, according to compression criteria, or, for instance according to a standard option. It is known by the skilled person in the art that it is possible to convert an image obtained by the projection of, for example, a point cloud according to a projection mapping to an equivalent image of the same point cloud according to a different projection mapping. Such a conversion may nevertheless imply some loss in the resolution of the projection.

FIGS. 4 and 5 are shown in shades of grey. It is naturally understood that they are examples of texture (color) images (encoding the texture (color) of the points of the scene), for example in RGB or in YUV. Images 40 and 50 each comprises data necessary for a 3 DoF rendering of the 3D scene. A decoder receiving a bitstream or data stream comprising, in a first element of syntax, an image as the example images 40 and/or 50 of FIG. 4 and/or FIG. 5 decodes the image using a method correlated to the method used for the encoding of the image. The stream may be encoded according to standard image and video compression methods and standard format for image and video transport, for example MPEG-2, H.264 or HEVC. The decoder may transmit the decoded image (or sequence of images) to a 3 DoF renderer or to a module for reformatting for example. A 3 DoF renderer would first un-project the decoded image from the projection surface (e.g. sphere for the ERP image 40 of FIG. 4 or cube for the image 50 of FIG. 5) and then generate the rectangular viewport requested by the viewing end-user device. In a variant, the renderer converts the image according to another different projection mapping before projecting it.

An image is compatible with a 3 DoF rendering when the image encodes points of a 3D scene according to a projection mapping. The scene may comprise points at 360°. Projection mappings commonly used to encode images compatible with 3 DoF rendering are, for instance, among spherical mappings: equirectangular projection; longitude/latitude projection; or different layouts of cubical projection mappings or pyramidal projection mappings.

Figure 6:
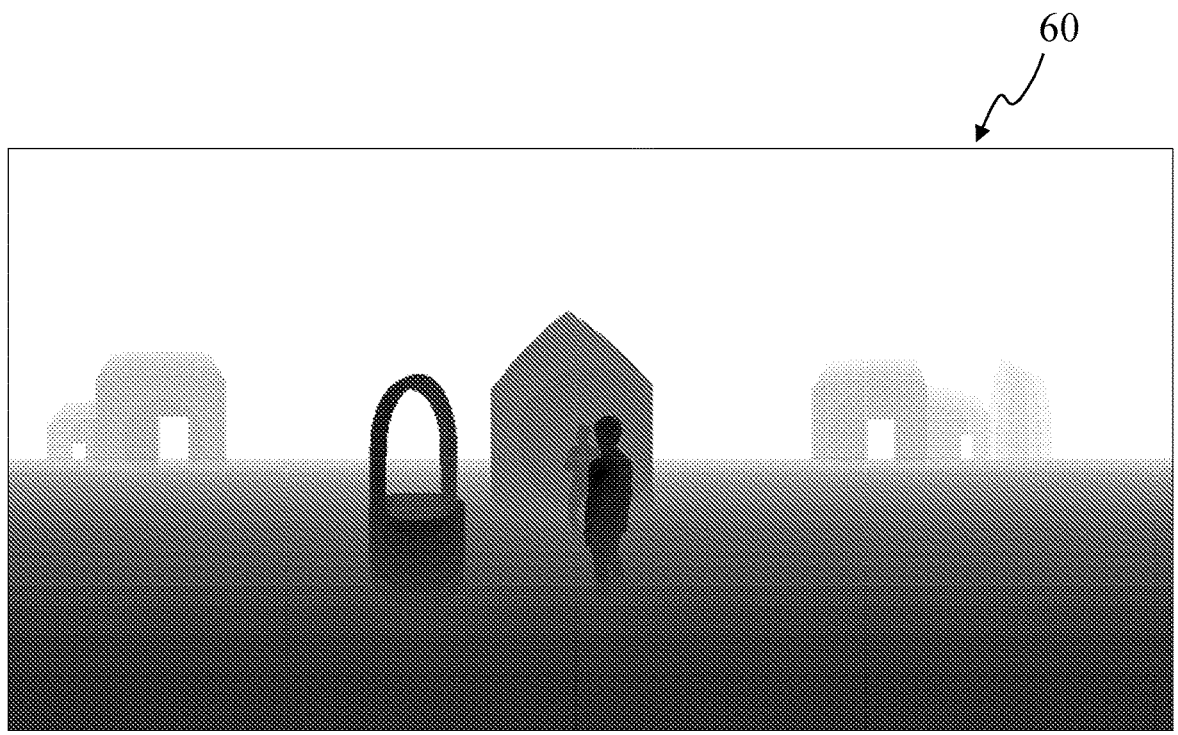
FIG. 6 shows a depth image (also called depth map) of the 3D scene of FIG. 1 according to the point of view of FIG. 2, according to a non-restrictive embodiment of the present principles.

FIG. 6 shows a depth image (also called depth map) of the 3D scene 10 according to the first viewpoint 20. Depth information is required for volumetric rendering. In the encoding example of the image of FIG. 6, the darker the pixel, the closer the point projected to this pixel from the viewpoint. For example, the depth may be encoded on twelve bits, that is the depth is represented by an integer between 0 and $2^{12}-1$ (=4095). If, for instance, the closest point is located at 1 meter from the determined viewpoint and the farthest point at 25 meters from the determined viewpoint, a linear encoding of depth would be performed by steps of 0.586 centimetres (=(2500−100)/4096). Depth may also be encoded according to a logarithmic scale as a depth value imprecision of a point far from the viewpoint is less important than a depth value imprecision for a point close to the viewpoint. In the example embodiment of FIG. 6, depth of points of the scene visible from the viewpoint is encoded in a depth map according to the same projection mapping than the projection mapping used to encode the color map of FIG. 5. In another embodiment, depth may be encoded according to a different projection mapping. The renderer converts the depth map and/or the color image to de-project points of the scene encoded in these data.

Figure 7:
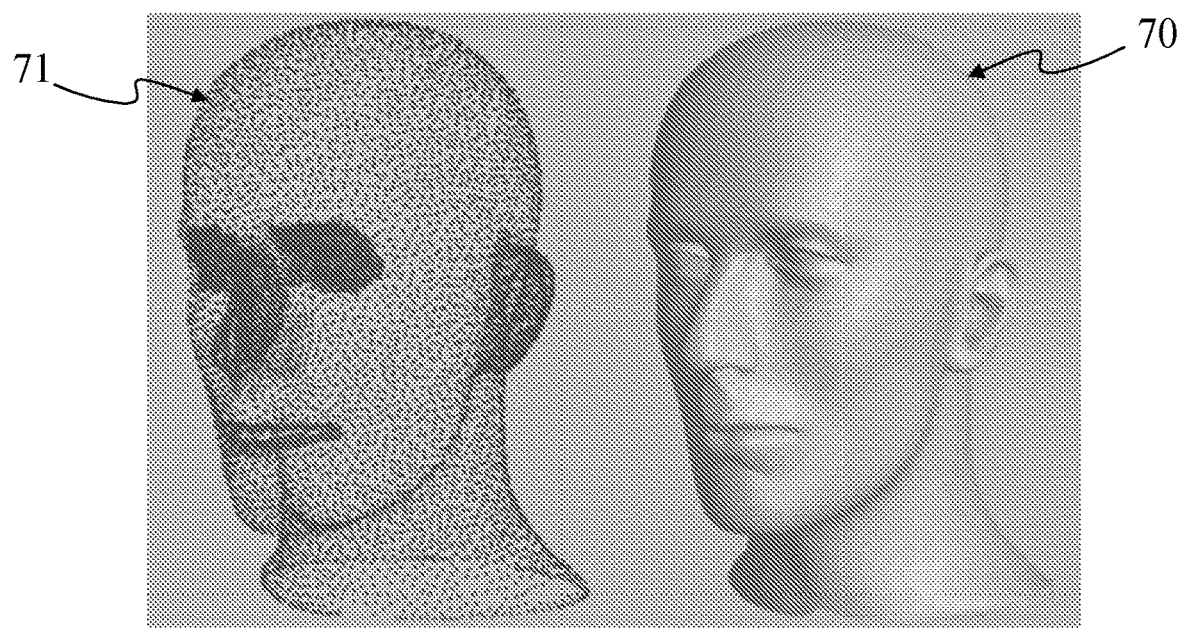
FIG. 7 shows a three-dimension (3D) model of an object of the 3D scene of FIG. 1 and points of a point cloud corresponding to the 3D model, according to a non-restrictive embodiment of the present principles.

FIG. 7 shows a three-dimension (3D) model of an object 70 and points of a point cloud 71 corresponding to the 3D model 70. The model 70 may be a 3D mesh representation and points of point cloud 71 may be the vertices of the mesh. Points of the point cloud 71 may also be points spread on the surface of faces of the mesh. The model 70 may also be represented as a splatted version of the point cloud 71, the surface of the model 70 being created by splatting the points of the point cloud 71. The model 70 may be represented by a lot of different representations such as voxels or splines. FIG. 7 illustrates the fact that a point cloud may be defined with a surface representation of a 3D object and that a surface representation of a 3D object may be generated from a point of cloud. As used herein, projecting points of a 3D object (by extension points of a 3D scene) onto an image is equivalent to projecting any image representation of this 3D object to create an object.

A point cloud may be seen as a vector-based structure, wherein each point has its coordinates (e.g. three-dimensional coordinates XYZ, or a depth/distance from a given viewpoint) and one or more attributes, also called component. An example of component is the color component that may be expressed in various color spaces, for example RGB (Red, Green and Blue) or YUV (Y being the luma component and UV two chrominance components). The point cloud is a representation of the object as seen from a given viewpoint, or a range of viewpoints. The point cloud may be obtained by many ways, e.g.:

from a capture of a real object shot by a rig of cameras, optionally complemented by depth active sensing device;

from a capture of a virtual/synthetic object shot by a rig of virtual cameras in a modelling tool;

from a mix of both real and virtual objects.

The volumetric parts of the 3D scene may for example be represented with one or several point clouds such as the point cloud 71.

Figure 8:
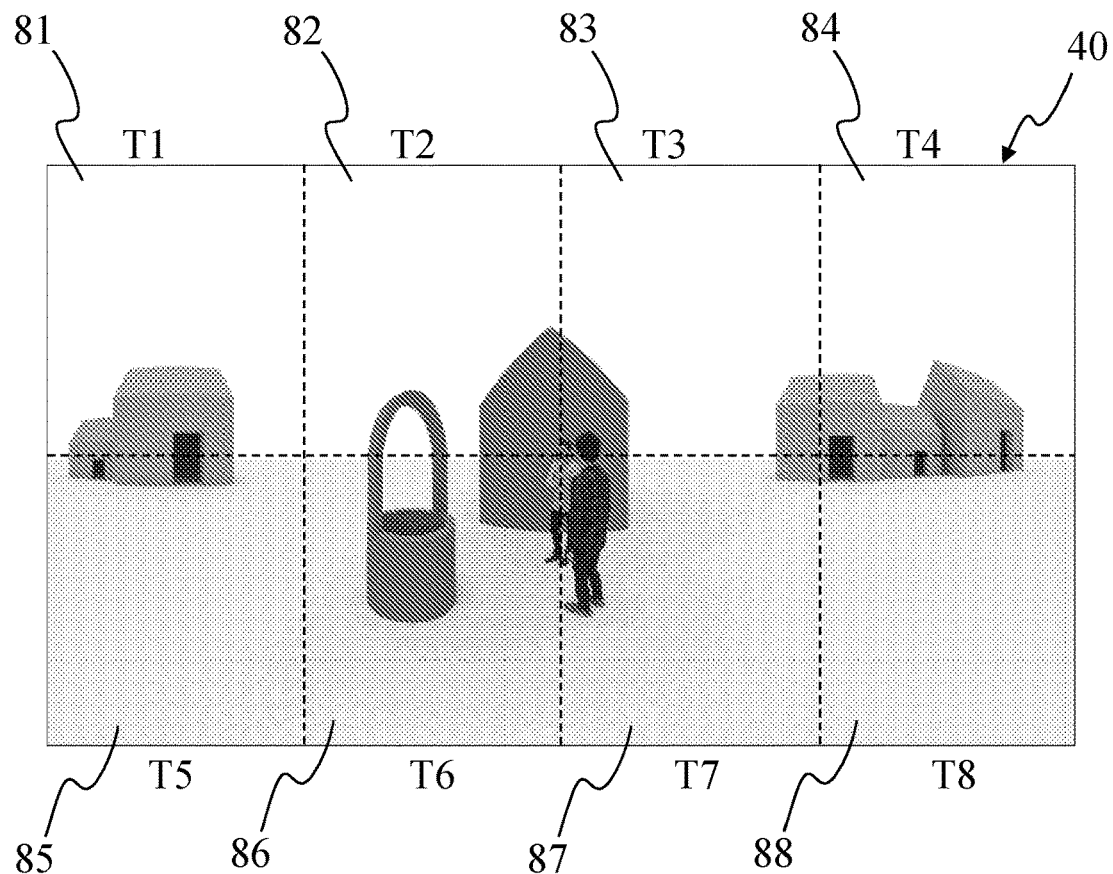
FIG. 8 shows the image of FIG. 4 partitioned into a plurality of tiles, according to a non-restrictive embodiment of the present principles.

FIG. 8 shows the tiling of the image 40 (also called first frame 40 in the following), according to a non-restrictive embodiment of the present principles. The first frame 40 corresponds to a large field-of-view (up to 360°) flat representation of the 3D scene, i.e. a 2D representation with only texture (color) information and no depth. A large field-of-view content (also called omnidirectional content) is a content having a field-of-view that is typically greater than the viewport of an end-user device, i.e. only a sub-part of the first frame 40 is displayed at a time on the end-user device. The first frame 40 is partitioned into a plurality of sub-parts or sub-areas 81 to 88, which may correspond to tiles in the sense of HEVC, VP9 or AV1 (developed by the Alliance for Open Media) for example. The tiles may for example be obtained by using motion-constrained HEVC tiling (MOTS).

According to a non-limiting example, the first frame (after equirectangular (ERP) projection was performed) is divided into 8 HEVC tiles 81 to 88. HEVC tiles correspond to non-overlapping rectangular regions, containing integer numbers of CTU (Coding Tree Unit, a CTU corresponding to a largest coding block, for example of size 64×64) and organized in a grid pattern, with rows and columns of fixed or variable size (for instance, Main 10 profile level 5.1 of HEVC sets the maximum number of tiles rows and columns to 11×10). The first frame content may for example be encoded in one or more resolutions using motion-constrained tile sets (MCTS), i.e. with no other prediction from other tiles. Each coded MCTS sequence may be stored encapsulated in a separate tile track within for example a ISOBMFF (ISO Base Media File Format) container. The number of tiles is not limited to 8 but may be any integer, for example greater than or equal to 2 and less than 110 (11×10) if based on HEVC Main 10 profile level 5.1.

A different 3D part or 3D section of the 3D scene is associated with each tile T1 81, T2 82, T3 83, T4 84, T5 85, T6 86, T7 87 and T8 88 of the first frame 40 (as explained with more details with regard to FIG. 10), the video content of a determined tile of the first frame corresponding to the result of the projection of the 3D part of the 3D scene associated with this determined tile.

Figure 9:
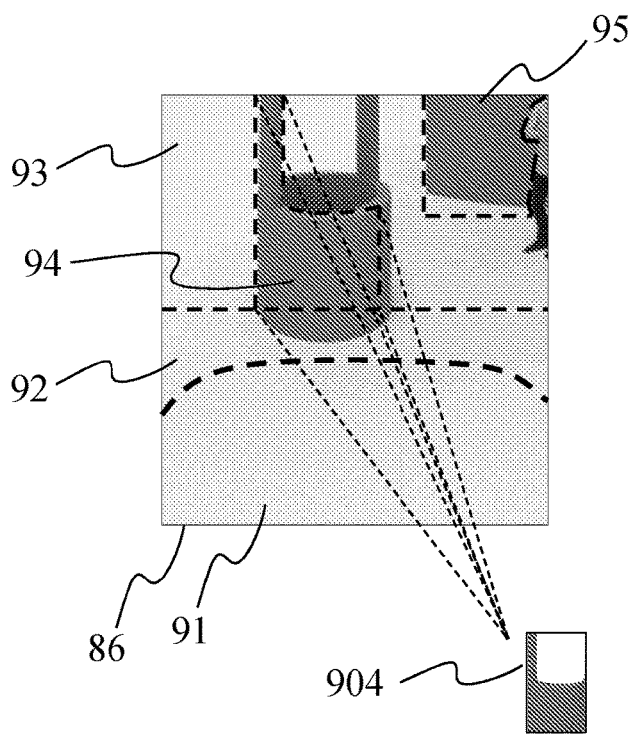
FIG. 9 shows the 2D parametrization of a part of the 3D scene of FIG. 1 associated with one tile of the image of FIG. 4, according to a non-restrictive embodiment of the present principles.

FIG. 9 shows the 2D parametrization of a 3D part of the 3D scene associated with one tile T6 86 of the first frame, according to a non-restrictive embodiment of the present principle. The same process may be applied to each 3D part of the 3D scene associated with the tiles T1, T2, T3, T4, T5, T7 and T8 of the first frame 40.

The points of the 3D scene comprised in the 3D part of the 3D scene associated with the tile T6 86 may be grouped to form one or more groups of points, points belonging to a same group having for example a depth information comprised in a determined range of depth (i.e. the points of a same group are depth consistent). The range of viewpoints comprised in the space of view (e.g. the cube) 11 is for example discretized into a plurality of viewpoints (e.g., 5, 10 or 20 viewpoints). According to another example, a plurality of viewpoints is obtained from the space of view 11 by defining a tetrahedron centered on the first viewpoint 20, the four vertices of the tetrahedron each defining a viewpoint of the plurality of viewpoints in addition to the first viewpoint 20. The points of the 3D part of the 3D scene associated with the tile T6 86 are grouped by considering the 3D part from each viewpoint of the plurality. To avoid that a same point belongs to a plurality of groups, the grouping may be first done for the first viewpoint and the points that have been grouped according to the first viewpoint are not considered for the next grouping according to another viewpoint. Examples of groups of points are illustrated on FIG. 9, for example groups 91 to 95, each group comprising for example points having a consistent depth, e.g. the group 94 comprises the points having a depth comprised between 2 m and 2.5 m (distance from the first viewpoint), the group 95 comprises the points having a depth comprised between 3.2 m and 3.9 m, the group 93 comprises the points having a depth comprised between 3.9 m and 10 m.

For each group of points, a patch is generated, the patch corresponding to a 2D parametrization of the group of points. For example, a patch 904 is generated from the group of points 94. One or more patches of each group of points of the 3D part are generated to represent each group of points in two dimensions, i.e. according to the 2D parametrization. One or more 2D parametrizations may be obtained for each group of points 91, 92, 93, 94 and 95. The 2D parametrization may vary from a group of points to another one. According to a variant, all 2D parametrizations associated with all groups of points are of the same type, e.g. a linear perspective projection or an orthographic projection. According to a variant, different 2D parametrizations may be used for a same group of points.

A 2D parametrization associated with one given group of points, e.g. the group 94, corresponds to a browsing in 2 dimensions of the given 3D group of points of the point cloud allowing to sample the given 3D group of points, i.e. a 2D representation of the content (i.e. the point(s)) of this given 3D group of points comprising a plurality of samples (that may correspond to the pixels of a patch image), the number of which depending from the sampling step that is applied. A 2D parametrization may be represented with a set of parameters and may be obtained in many ways, for example by implementing any one of the following methods:

equirectangular projection (ERP) of the points of the group of points of the point cloud onto a sphere associated with a viewpoint, the parameters representative of the ERP projection comprising the location of the sphere, its orientation and the spatial sampling step;

linear perspective projection of the points of the group of points of the point cloud onto a plane associated with a viewpoint, the parameters representative of the linear perspective projection comprising the location of the virtual camera, the focal length, the spatial sampling step and the field of view in the 2 dimensions;

orthographic projection of the points of the group of points of the point cloud onto a surface, the parameters representative of the orthographic projection comprising the geometry (shape, size and orientation) of the projecting surface and spatial sampling step;

LLE (Locally-Linear Embedding) that corresponds to a mathematical operation of dimension reduction, here applied to convert/transform from 3D to 2D, the parameters representative of the LLE comprising the transformation coefficients.

Each patch has advantageously a rectangular shape to ease the packing process that will be explained hereinafter. Each patch may comprise geometry information obtained by the projection/2D parametrization of the points of the associated group of points. Geometry information may correspond to depth information or information on the position of the vertices of a mesh element. A patch may further comprise the texture information associated with the points of the associated group of points, except when the patch is obtained from points visible from the first viewpoint. For points visible from the first viewpoint, the texture information may be obtained from the first frame 40. According to a variant, geometric patches comprising only geometry information are generated and texture patches comprising only texture information are further generated, when needed.

Mapping information that links each 2D parametrization with its associated patch may be generated. The mapping information may be generated to keep the connection between a 2D parametrization and the associated geometry patch and texture patch in the frames into which the patches are arranged. The mapping information may for example be of the form of:

{parameters of the 2D parametrization; geometry patch ID; texture patch ID} wherein the geometry patch ID may be an integer value or a pair of values comprising the column index U and the row index V the geometry patch belongs to in the frame it is arranged; the texture patch ID may be an integer value or a pair of values comprising the column index U' and the row index V' the texture patch belongs to in the matrix of patches of the frame(s) (or of the tiles of the frame(s)) the patches belong to.

The same mapping information is generated for each 2D parametrization and associated geometry patch and texture patch. Such a mapping information enables to reconstruct the corresponding parts of the 3D scene by establishing the association of the 2D parametrization with corresponding geometry patch and texture patch. If the 2D parametrization is a projection, the corresponding part of the 3D scene may be reconstructed by de-projecting (performing the inverse projection) the geometry information comprised in the associated geometry patch and the texture information in the associated texture patch. The mapping information then corresponds to a list of mapping information:

{parameters of the 2D parametrization; geometry and texture patch ID}$_i$,

For i=1 to n, with n the number of 2D parametrizations.

Figure 10:
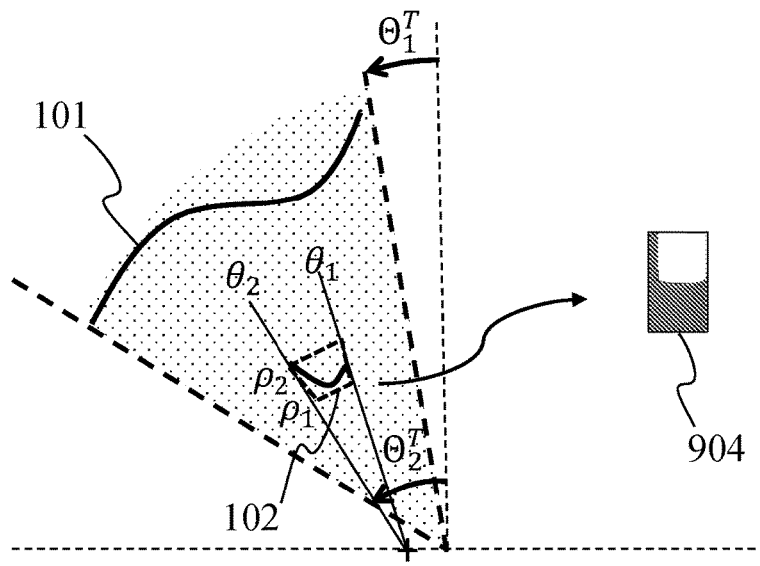
FIG. 10 shows a two-dimensional view of an angular viewing sector of the part of the scene illustrated in FIG. 9, according to a non-restrictive embodiment of the present principles.

FIG. 10 shows a two-dimensional view of an angular viewing sector corresponding to the 3D part of the 3D scene associated with the tile T6 86 of the first frame 40, according to a non-restrictive embodiment of the present principle.

As explained in relation to FIG. 8, each first tile T1 81 to T8 88 is associated with a 3D part of the 3D scene. When the first frame 40 is obtained by equirectangular or cube-map projection mapping, the 3D part associated with a given first tile T (T∈[1,8] in the non-limiting example of FIG. 8) corresponds to a viewing angular range 101 from the first viewpoint, which may be defined with ($[\Theta_1^T, \Theta_2^T], [\Phi_1^T, \Phi_2^T]$). A number of 3D-patches may be obtained from the 3D part to generate patches such as the patch 904 by 2D-parametrization of the 3D-patches. A 3D-patch corresponds to a subset of the 3D part, i.e. to a group of points obtained as explained with regard to FIG. 9. A 3D-patch 102 may for example be defined with a viewing angle and a range of distances from a determined viewpoint (either the first viewpoint 20 or any of the viewpoints obtained from the discretization of the space of view 11). The 3D-patch 102 is for example defined with ($[\theta_1, \theta_2], [\varphi_1 \varphi_2], [\rho_1, \rho_2]$), wherein ($[\theta_1, \theta_2], [\varphi_1 \varphi_2]$) corresponds to an angular range corresponding to the viewing angle and ($[\rho_1, \rho_2]$) corresponds to the range of distances. One or more constraints may be applied when defining the 3D-patches (or groups of points). For example, the spherical range ($[\theta_1, \theta_2], [\varphi_1 \varphi_2], [\rho_1, \rho_2]$) associated with a 3D-patch must be contained or must fit the viewing angular range ($[\Theta_1^T, \Theta_2^T], [\Phi_1^T, \Phi_2^T]$) of the first tile T6 86 defined in the first frame to avoid that a same 3D-patch spans over two different first tiles of the first frame (or equivalently over two different viewing angular ranges associated with the two different tiles). A patch 904 comprising depth information and/or texture information is obtained by 2D-parametrization of the points of the 3D-patch 102, as explained with regard to FIG. 9. As explained with regard to FIG. 9, a geometric patch 904 associated with the 3D-patch 102 may be generated and a texture geometric patch associated with the 3D-patch 102 may be further generated. When the 3D-patch 102 is viewed/defined from the first viewpoint 20, the patch 904 comprises only geometry information, the texture information may be retrieved from the first frame 40.

Figure 11:
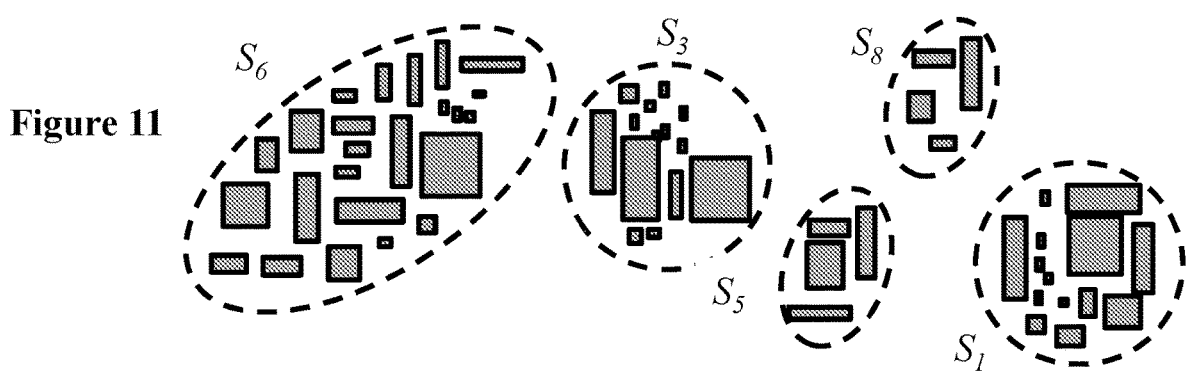
FIG. 11 shows an example of groups of patches of the 3D scene obtained by 2D parametrization of parts of the scene associated with the tiles of FIG. 8, according to a non-restrictive embodiment of the present principles.

FIG. 11 shows examples of groups of patches obtained by 2D parametrization of 3D-patches of 3D parts of the scene associated with the first tiles of the first frame 40, according to a non-restrictive embodiment of the present principle.

FIG. 11 illustrates some of the groups of patches obtained by 2D-parametrization of groups of points comprised in the parts of the scene associated with some first tiles of the first frame 40. FIG. 11 shows for example a group of patches S1 associated with the first tile T1 81 of the first frame 40, a group of patches S3 associated with the first tile T3 83 of the first frame 40, a group of patches S5 associated with the first tile T5 85 of the first frame 40, a group of patches S6 associated with the first tile T6 86 of the first frame 40 and a group of patches S8 associated with the first tile T8 88 of the first frame 40. Even if not illustrated, groups of patches S2, S4 and S7 may be obtained from the content of the 3D parts of the scene associated with respectively the first tiles T2 82, T4 84 and T7 87.

A group of patches may comprise patches comprising depth information and texture information. According to a variant, a group of patches may comprise patches comprising only depth information or only texture information. When a group of patches comprises patches comprising only depth information (respectively texture information), a corresponding group of patches comprising patches comprising only texture information (respectively depth information) may be generated. According to the latter variant, the number of depth patches comprised in a group (e.g. group S1 associated with the first tile T1) may be different from (for example greater than) the number of texture patches comprised in the corresponding group (e.g. group S1', not illustrated, associated with the same first tile T1 as the group S1).

The number of patches comprised in a group may vary from a group to another group. For example, the number of patches comprised in the group S1 is greater than the number of patches comprised in the groups S5 and S8 but lower than the number of patches comprised in the groups S3 and S6. The number of patches comprised in a group (e.g. group S1) may depend from the content of the 3D part of the scene associated with the first tile associated with said group (e.g. first tile T1). The number of patches may for example depend from the number of depth-consistent groups of points comprised in the 3D part of the scene corresponding to the first tile (e.g. first tile T1) associated with the group of patches (e.g. S1).

According to a variant, the number of patches is the same in each groups of patches. The number of patches may be a user-defined value, or a default value stored in the device configured to generate the patches and the groups of patches.

Figure 12:
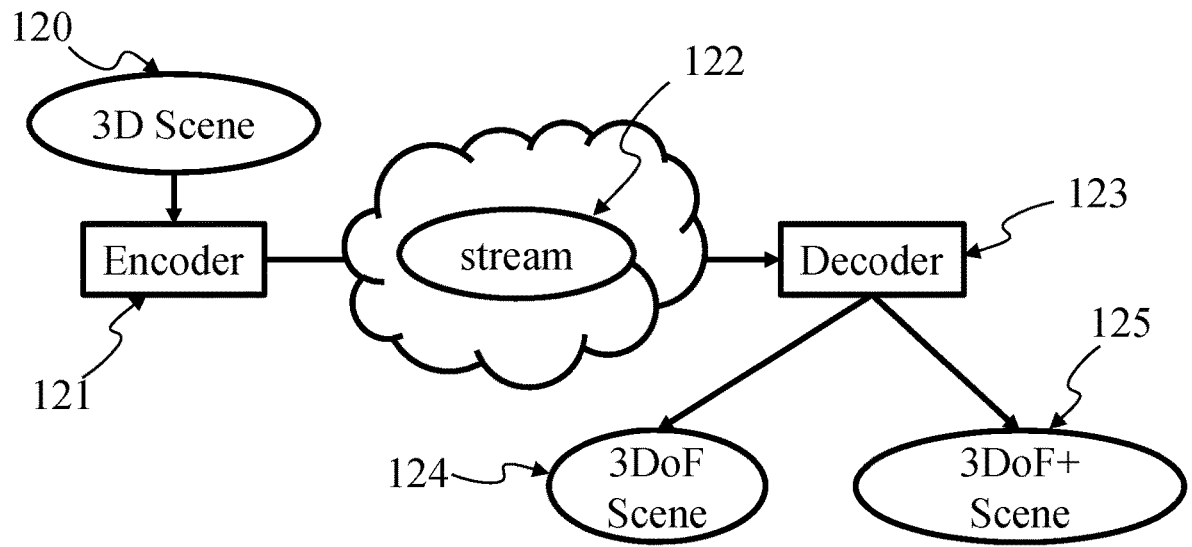
FIG. 12 shows an example of the encoding, transmission and decoding of a sequence of 3D scene in a format that is, at the same time, 3 DoF rendering compatible and 3 DoF+ rendering compatible, according to a non-restrictive embodiment of the present principles.

FIG. 12 shows a non-limitative example of the encoding, transmission and decoding of data representative of 3D scene in a format that is, at the same time, compatible for 3 DoF and 3 DoF+ rendering.

A 3D scene 120 (or a sequence of 3D scenes) is encoded in a stream 122 by an encoder 121. The stream 122 comprises a first element of syntax carrying data representative of a 3D scene for a 3 DoF rendering (data of the first image 40 of FIG. 8) and at least a second element of syntax carrying data representative of the 3D scene for 3 DoF+ rendering (e.g. data of one or more second/third images 130 of FIG. 13 and/or data of one or more fourth images 151, 152 of FIG. 15).

The encoder 121 is for example compliant with an encoder such as:
 HEVC (its specification is found at the ITU website, T recommendation, H series, h265, http://www.itu.int/rec/T-REC-H.265-201612-I/en);
 3D-HEVC (an extension of HEVC whose specification is found at the ITU website, T recommendation, H series, h265, http://www.itu.int/rec/T-REC-H.265-201612-I/en annex G and I);
 VP9 developed by Google; or
 AV1 (AOMedia Video 1) developed by Alliance for Open Media.

A decoder 123 obtains the stream 122 from a source. For example, the source belongs to a set comprising:
 a local memory, e.g. a video memory or a RAM (or Random-Access Memory), a flash memory, a ROM (or Read Only Memory), a hard disk;
 a storage interface, e.g. an interface with a mass storage, a RAM, a flash memory, a ROM, an optical disc or a magnetic support;
 a communication interface, e.g. a wireline interface (for example a bus interface, a wide area network interface, a local area network interface) or a wireless interface (such as a IEEE 802.11 interface or a Bluetooth® interface); and
 a user interface such as a Graphical User Interface enabling a user to input data.

The decoder 123 decodes the first element of syntax of the stream 122 for 3 DoF rendering 124. For 3 DoF+ rendering 125, the decoder decodes both the first element of syntax and the second element of syntax of the stream 122.

The decoder 123 is compliant with the encoder 121, for example compliant with a decoder such as:
 HEVC;
 3D-HEVC (an extension of HEVC);
 VP9; or
 AV1.

Figure 13:
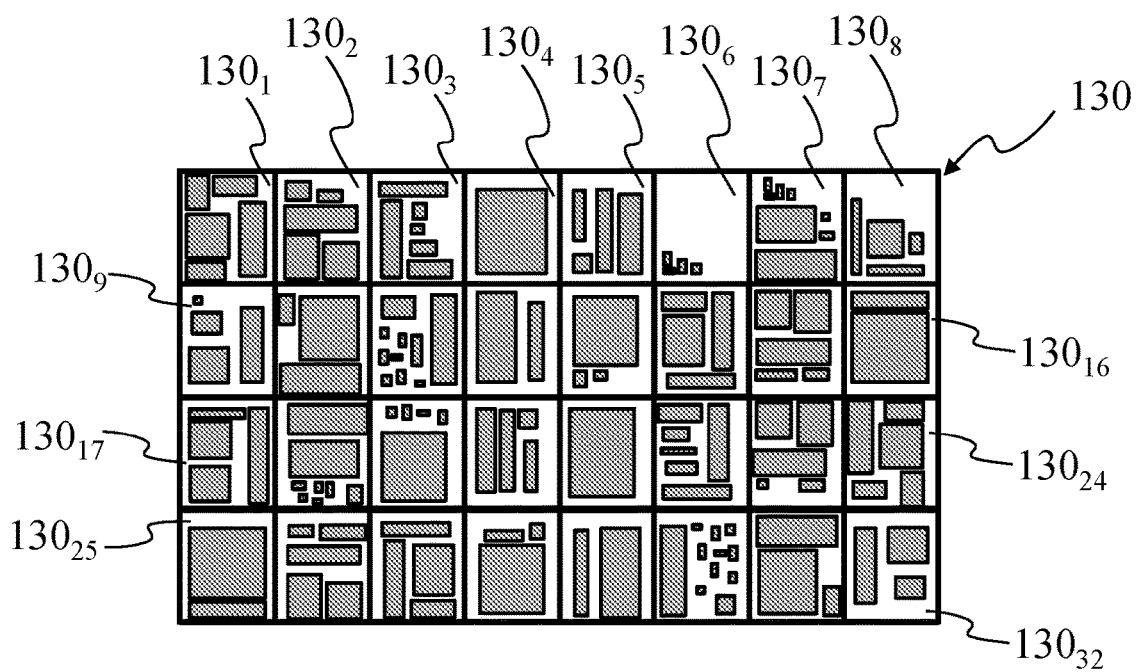
FIG. 13 shows an example of the arrangement of patches of FIG. 11 within tiles of a frame, according to a non-restrictive embodiment of the present principles.

FIG. 13 shows an example of the arrangement of patches comprised in the groups of patches of FIG. 11 within second tiles $130_1$ to $130_{32}$ of a second frame 130, according to a non-restrictive embodiment of the present principles.

The second frame 130 is divided into a plurality of second tiles $130_1$ to $130_{32}$, for example 32 second tiles in the non-limiting example of FIG. 13. The number of second tiles is not limited to 32 and may be any number as long as the number of second tiles is greater than the number of first tiles of the first image 40. As for the first tiles, the size (e.g. height and width) of each second tile $130_1$ to $130_{32}$ is such that a second tile may contain an integer number (greater than or equal to 1) of CTU (Coding Tree Unit, a CTU corresponding to a largest coding block, for example of size 64×64), the second tiles $130_1$ to $130_{32}$ being organized in a grid pattern, with rows and columns of fixed or variable size (for instance, Main 10 profile level 5.1 of HEVC sets the maximum number of tiles rows and columns to 11×10).

The second tiles $130_1$ to $130_{32}$ are associated with the first tiles T1 to T8, one or more second tiles being assigned to each first tile. For example, 2 second tiles (e.g. second tiles $130_1$ to $130_2$) may be assigned to the first tile T1, 4 second tiles (e.g. second tiles $130_3$ to $130_6$) may be assigned to the first tile T2, 5 second tiles (e.g. second tiles $130_7$ to $130_{11}$) may be assigned to the first tile T3, 5 second tiles (e.g. second tiles $130_{12}$ to $130_{16}$) may be assigned to the first tile T4, 3 second tiles (e.g. second tiles $130_{17}$ to $130_{19}$) may be assigned to the first tile T5, 5 second tiles (e.g. second tiles $130_{20}$ to $130_{24}$) may be assigned to the first tile T6, 5 second tiles (e.g. second tiles $130_{25}$ to $130_{29}$) may be assigned to the first tile T7 and 3 second tiles (e.g. second tiles $130_{30}$ to $130_{32}$) may be assigned to the first tile T8. The second tiles are used to contain and transport the patches obtained by 2D-parametrizing the 3D parts of the scene associated with the first tiles T1 to T8. The patches comprised in the group of patches $S_1$ obtained by 2D parametrizing the 3D part associated with the first tile T1 are arranged in the second tiles $130_1$ to $130_2$ assigned to the first tile T1; the patches of the group $S_2$ are arranged in the second tiles $130_3$ to $130_6$ assigned to the first tile T2; the patches of the group $S_3$ are arranged in the second tiles $130_7$ to $130_{11}$ assigned to the first tile T3, and so on.

The second tiles are for example obtained by subdividing the first tiles. A first tile may for example be subdivided into 2, 4 or 8 second tiles.

The number of second tiles assigned to a first tile may for example be dependent from the number of patches comprised in the group of patches associated with the first tile. This number may further be limited to a maximum value so that each first tile may be assigned at least one second tile.

The second image 130 may comprise patches comprising depth and texture information. According to a variant, the second image 130 may comprise patches comprising only depth information and a third image is generated to comprise patches comprising the texture information associated with the first tiles, except for the patches obtained from the first viewpoint. The third image comprises a plurality of third tiles, the number of third tiles being greater than the number of first tiles.

Parameters such as frame size and number of tiles may be the same for the first and second images. According to a variant, one or more of the parameters are different for the first and the second images.

Figure 14:
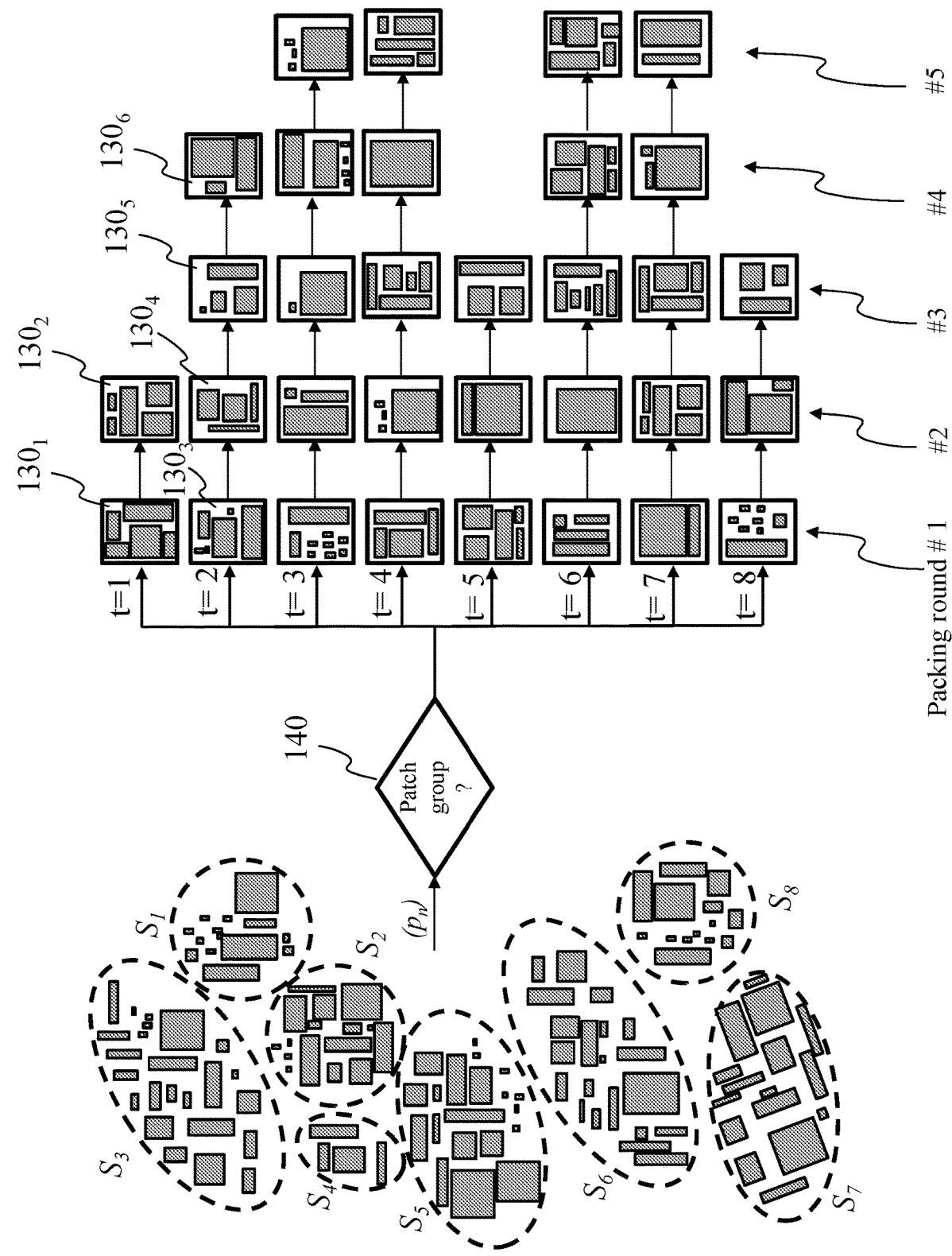
FIG. 14 shows an example of a process for arranging the patches of FIG. 11 in the tiled frame of FIG. 13, according to a non-restrictive embodiment of the present principles.

FIG. 14 shows a non-limiting example of a process for arranging the patches of the group of patches $S_1$ to $S_8$ in the second tiles of the second frame 130 (and/or in the third frame).

The initial budget in terms of second tiles is 32 according to the example of FIG. 14.

The input of the process consists of a list of N groups $S_t$ of i patches $P_i^t$ (i and N being integers, i corresponding to the number of patches in a group, with N=8 according to the example of FIG. 14), with $S_t = \{P_i^t\}_{i \in [1,N_t]}$, $t \in [1,N]$, each group $S_1$ to $S_8$ corresponding to a first tile T1 to T8 in the first frame 40.

In a first operation, it is checked whether the size of each input patch $P_i^t$ is not wider or higher than the size of a second tile. For example, considering that the size of the second frame 130 is 2048×1024 pixels and that the 32 second tiles have the same size, the size of a second tile is 256×256 pixels. When a patch does not fit into the target second tile size, the patch is split into smaller patches having each a size less than the target second tile size.

In a second operation, the input patches $P_i^t$ are sorted by decreasing visual importance. The visual importance of a patch may depend on its distance to the viewing point (the farther, the less important), and/or its angular location with respect to the principal viewing direction (far left, right, up or down patches are less important than central ones), and/or the occlusions (patches occluded from central viewing point are less important). The sorting according to the visual importance is performed for all input patches, i.e. by processing all input patches of all groups of patches $S_1$ to $S_8$ at a same time and not by considering the groups of patches $S_1$ to $S_8$ in parallel or one after the other. Nevertheless, the information relating the belonging of the input patches to the groups of patches is kept for the following operations.

N packing algorithms may for example be run in parallel, one packing algorithm for each group of patches $S_1$ to $S_8$. As examples, the Shelf, Guillotine, Maximal Rectangles and Skyline methods, with all their variants, described in "A thousand ways to pack the bin—A practical approach to two-dimensional rectangle bin packing" by J. Jylänki, may be used as packing algorithm.

In a third operation, the input patches may be processed one by one, beginning by the most visually important. The group of patches an input patch belongs to is determined (for example retrieved from metadata associated with the input patches) and the input patches are directed to the packing branch (t=1 to 8) corresponding to the group of patches they each belong to. One or more second tiles $130_1$ to $130_{32}$ are assigned to each packing branch.

When in one of the packing branches there is no more room in a current second tile for the currently incoming patch, a new empty second tile is created and the packing resumes to a next packing round. For following patches in that packing branch, all second tiles created during a previous packing round remains as potential target second tiles. Indeed, a new incoming input patch may be smaller than previous ones and be arranged in a previously created second tile.

The process stops when all input patches have been processed or the second tiles budget has been used up and all second tiles are filled. If the second frame 130 is undersized and all input patches cannot be packed, the remaining unpacked patches are not packed and are discarded. As the input patches have been processed according to their visual importance, the discarded input patches correspond to the least visually important input patches, which limits the issues when rendering the 3D scene from the patches of the second frame 130.

Figures 15, 16:
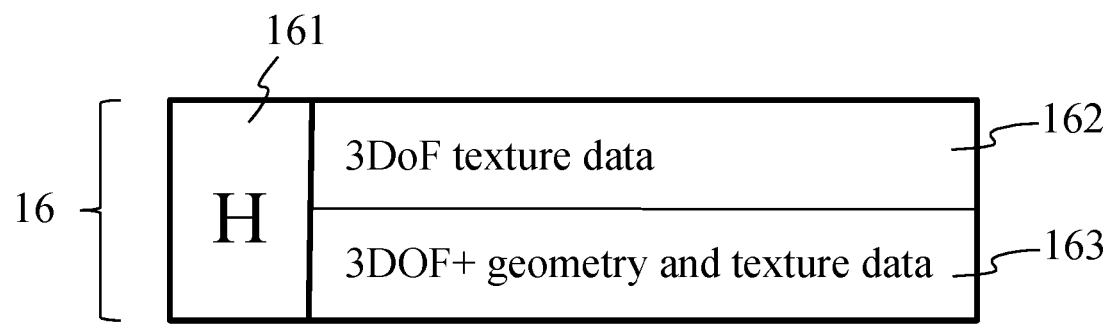
FIG. 15 shows examples of fourth frames obtained from tiles of the tiled frame of FIG. 13, according to a non-restrictive embodiment of the present principles.
FIG. 16 shows an example of the syntax of a bitstream carrying the information and data representative of the 3D scene of FIG. 1, according to a non-restrictive embodiment of the present principles.

FIG. 15 shows non-limiting examples of two fourth frames 151, 152 obtained from second tiles of the second frame 130 (and/or from third tiles of third frame).

The fourth frames 151, 152 each comprises patches contained in a part of the second tiles of the second frame 130. The second tiles in a fourth frame correspond to a selection of some of the first tiles in the first frame, a mapping existing between the first tiles and the second tiles. At the rendering side, only a part of the first frame may be needed as the viewport of the end-user device used for rendering the content may be smaller than field-of-view of the content of the first frame 40. According to the viewing direction that may be determined at the level of the end-user device, only a sub-part of the frame 40 may be displayed and only the first tiles corresponding to this sub-part need to be decoded and rendered.

The fourth frame 151 comprises for example 20 fourth tiles arranged in 5 columns and 4 rows (with for example a resolution of 1280×1024 pixels). The fourth frame 151 comprises the data corresponding to the viewport encompassing the 3D parts of the 3D scene associated with the first tiles T1, T2, T5 and T6 and comprises the patches obtained by 3D-parametrization of the 3D parts of the 3D scene associated with these first tiles T1, T2, T5 and T6, i.e. the patches comprised in the second tiles $130_1$, $130_2$, $103_3$, $103_4$, $130_5$, $130_6$, $130_{17}$, $130_{18}$, $130_{19}$, $130_{20}$, $130_{21}$, $130_{22}$, $130_{23}$ and $130_{24}$. A tile of this fourth frame may correspond to a second tile and comprise the content (the patches and data comprised in the patches) of the corresponding second tile, the second tile being identified by its index, i.e. 1 to 32. The remaining tiles of this fourth frame, i.e. the tiles filled with diagonal stripes, are empty and contain no data or dummy data.

The fourth tiles may be obtained from the second tiles or directly from the 2D parametrization process, without generating the second tiles of the second frame of FIG. 13.

First, second, third and fourth frames have each a fixed size over time and a fixed number of tiles over time. The size and/or number of tiles may be either the same for the first, second, third and fourth frames or may be different between the first, second, third and/or fourth frames.

The fourth frame 152 comprises 20 fourth tiles arranged in 5 columns and 4 rows, as for the fourth frame 151. The fourth frame 152 comprises the data corresponding to the viewport encompassing the 3D parts of the 3D scene associated with the first tiles T2, T3, T6 and T7 and comprises the patches obtained by 3D-parametrization of the 3D parts of the 3D scene associated with these first tiles T2, T3, T6 and T7, i.e. the patches comprised in the second tiles $103_3$, $103_4$, $130_5$, $130_6$, $103_7$, $103_8$, $130_9$, $130_{10}$, $130_{11}$, $130_{20}$, $130_{21}$, $130_{22}$, $130_{23}$, $130_{24}$, $130_{25}$, $130_{26}$, $130_{27}$, $130_{28}$ and $130_{29}$. The second tiles allocated to the fourth frame are identified with their index 3, 4, 5, 6, 7, 8, 9, 10, 11, 20, 21, 22, 23, 24, 25, 26, 27, 28 and 29. The remaining tile of the fourth frame, i.e. the tile filled with diagonal stripes, is empty and contains no data or dummy data.

Generally speaking, there are C combinations of first tiles in the first frame 40 corresponding to the omnidirectional flat image/video of the scene, each combination of M first tiles corresponding to a different viewport orientation (M being an integer, for example equal to 4). Only W'×H' first tiles among the complete set of W×H first tiles (W'≤W, H'≤H, W being equal to 4 and H to 2 in the example of FIG. 8) are requested and an extractor track performs their aggregation into a tiled HEVC (or VP9 or AV1) compliant bitstream prior to decoding.

A similar aggregation process is performed for the subset of T second tiles (among the complete set of $W_\alpha \times H_\alpha$ second tiles) corresponding to one of the C combinations of first tiles. The second tiles having all the same size, a tiled aggregation into a rectangular frame (e.g. the fourth frame 151, 152) of $W'_\alpha \times H'_\alpha$ tiles is always possible ($W'_\alpha \le W_\alpha$, $H'_\alpha \le H_\alpha$). There are 3 possibilities:
(i) $T = W'_\alpha \times H'_\alpha$: the full decoder-side tiling grid (i.e. the fourth frame) is used for the aggregation;
(ii) $T < W'_\alpha \times H'_\alpha$: only a part of the decoder-side tiling grid is used, and dummy values fill the unused tiles (shown with diagonal stripes);
(iii) $T > W'_\alpha \times H'_\alpha$: the full decoder tiling grid (i.e. the fourth frame) is used but some second tiles are dropped; as each patch is assigned a visual importance value (according to the packing algorithm described in relation to FIG. 14), the tile visual importance is defined as the maximum visual importance of the patches packed within; tiles with smallest visual importance are dropped in priority.

FIG. 16 shows a non-limiting example of an embodiment of the syntax of a stream carrying the information and data representative of the 3D scene when the data are transmitted over a packet-based transmission protocol. FIG. 16 shows an example structure 16 of a volumetric video stream. The structure consists in a container which organizes the stream in independent elements of syntax. The structure may comprise a header part 161 which is a set of data common to every syntax elements of the stream. For example, the header part comprises metadata about syntax elements, describing the nature and the role of each of them. The header part may also comprise the coordinates of the viewpoint used for the encoding of the first frame for 3 DoF rendering and information about the size and the resolution of the frames. The structure comprises a payload comprising a first element of syntax 162 and at least one second element of syntax 163. The first syntax element 162 comprises data representative of the first frame prepared for a 3 DoF rendering, corresponding for example to a first video track associated with the texture data of the first frame encoded in the first syntax element.

The one or more second syntax elements 163 comprises geometry information and texture information associated with for example one or more second video tracks. The one or more second syntax elements 163 comprise for example data representative of the one or more second frames and/or third frames described in relation to FIG. 13.

According to a variant, the one or more second syntax elements 163 comprise the data representative of the one or more fourth frames described in relation to FIG. 15.

According to a further variant, the stream further comprises at least an instruction to extract at least a part of said first data and second data in one or more third elements of syntax.

For illustration purpose, in the context of ISOBMFF file format standard, texture patches, geometry patches and the metadata would typically be referenced in ISOBMFF tracks in a box of type moov, with the texture data and geometry data themselves embedded in media-data box of type mdat.

Figure 17:
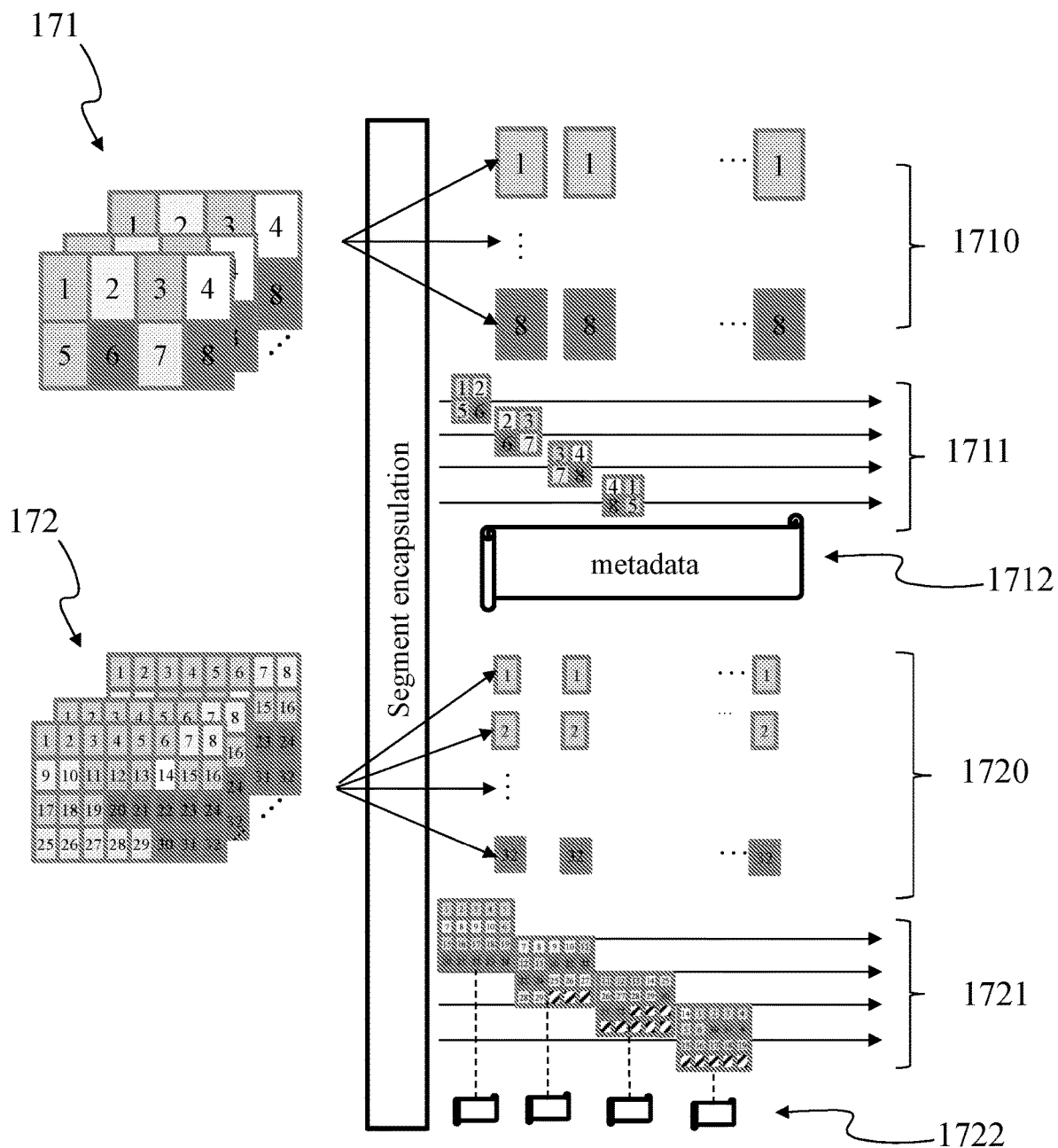
FIG. 17 shows an example of a process to encode the 3D scene of FIG. 1, according to a non-restrictive embodiment of the present principles.

FIG. 17 shows a non-limiting example of a process to encode the 3D scene. The process of FIG. 17 corresponds to the tile-based encoding (e.g. tile-based HEVC or tile-based AV1) and file encapsulation of a volumetric video.

A sequence 171 of first frames 40 may be encoded to obtain:
 A plurality of tile tracks 1710 conveying the retro-compatible omnidirectional video, each tile track comprising the data comprised in one different first tile among the N first tiles T1 to T8 (for example one tile track to convey the content of the first tile T1, one tile track to convey the content of the first tile T2, one tile track to convey the content of the first tile T3, . . . and one tile track to convey the content of the first tile T8); the number of tile tracks may be comprised between for example 2 and N, N corresponding to the number of first tiles in the first frame 40;
 Metadata 1712 corresponding to the projection used to obtain the first frame, the stitching and region-wise packing to render the omnidirectional video;
 One or more extractor tracks 1711, up to a maximum number of extractor tracks corresponding to the number of C possible viewport orientations; an extractor comprises instructions to reconstruct a bitstream that may be decoded by one decoder, the reconstructed bitstream being syntactically correct for decoding by the decoder.

The signal obtained at the output of the encoding process may comprise for example 8 tile tracks 1710 (8 corresponding to the number of first tiles in the example of FIG. 8), 4 extractor tracks 1711 (4 corresponding to the number of possible combinations of the first tiles according to the viewport orientation at the end-user device, namely a first combination comprising the first tiles T1, T2, T5, T6; a second combination comprising the first tiles T2, T3, T6, T7; a third combination comprising the first tiles T3, T4, T7, T8; and a fourth combination comprising the first tiles T4, T1, T8, T5), and the metadata 1712.

According to a variant, the signal comprises only a part of the 8 tile tracks 1710, only one extractor track 1711 and the metadata 1712. For example, the decoder may transmit a request requesting a given viewport orientation corresponding to one of the combination of the first tiles, for example the second combination comprising the first tiles T2, T3, T6, T7. Responsive to the request, the encoder may encode only the extractor track corresponding to the request with the tile tracks 2, 3, 6 and 7 comprising the data associated with the first tiles T2, T3, T6 and T7 and transmit the requested extractor, the 4 tile tracks needed to reconstruct a bitstream for rendering the requested viewport with the associated metadata 1712. Such a variant enables to reduce the encoding costs and the bandwidth needed to transport the data. Such viewport dependent content delivery may be implemented based on a DASH streaming mechanism (ISO/IEC 23009-1, Dynamic adaptive streaming over HTTP).

The encoding of the sequence 171 enables a rendering of the omnidirectional video after decoding, the tracks obtained from the encoding of this sequence 171 being for example compliant with OMAF standard (ISO/IEC 23090-2 Information Technology—Coded representation of immersive media (MPEG-I)—Part 2: Omnidirectional media format).

A sequence 172 of second frames 130 may be encoded to obtain:
 A plurality of tile tracks 1720 conveying the second tiles and associated patches, each tile track comprising the data comprised in one different second tile among the M second tiles $130_1$ to $130_{32}$;
 Metadata 1722 comprising for example the un-projection parameters of the patches, information representative of the location within the second tiles of the second frame (respectively the location within the third tiles of the third frame, when applicable); and
 One or more extractor tracks 1721, up to a maximum number of extractor tracks corresponding to the number of C possible viewport orientations; an extractor comprises one or more instructions to reconstruct a bitstream that may be decoded by one decoder, the reconstructed bitstream being syntactically correct for decoding by the decoder; an extractor contains an instruction to extract data from another track, which is linked to the track into which the extractor resides, as described in "*Information Technology—Coding of audio-visual objects—Part 15: carriage of NAL unit structured video in the ISO Base Media File Format, AMENDMENT* 1: *Carriage of Layered HEVC*", ISO/IEC 14496-15:2014/PDAM 1, dated Jul. 11, 2014.

The signal obtained at the output of the encoding process may comprise for example 32 tile tracks 1720 (32 corresponding to the number of second tiles in the example of FIG. 13), 4 extractor tracks 1721 (4 corresponding to the number of possible combinations of the first tiles according to the viewport orientation at the end-user device, namely a first combination comprising the second tiles allocated to the first tiles T1, T2, T5, T6; a second combination comprising the second tiles allocated to the first tiles T2, T3, T6, T7; a third combination comprising the second tiles allocated to the first tiles T3, T4, T7, T8; and a fourth combination comprising the second tiles allocated to the first tiles T4, T1, T8, T5), and the metadata 1722.

According to a variant, the signal comprises only a part of the 32 tile tracks 1720, only one extractor track 1721 and the metadata 1722. For example, the decoder may transmit a request requesting a given viewport orientation corresponding to one of the combination of the first tiles, for example the second combination comprising the second tiles allocated to the first tiles T2, T3, T6, T7. Responsive to the request, the encoder may generate only the extractor track corresponding to the request and encode the tile tracks comprising the second tiles allocated to the first tiles T2, T3, T6 and T7 comprising the data associated with the second tiles allocated to the first tiles T2, T3, T6 and T7, and transmit the requested extractor, the associated tile tracks needed to reconstruct a bitstream for rendering the requested viewport with the associated metadata 1722. Such a variant enables to reduce the encoding costs and the bandwidth needed to transport the data. Such viewport dependent content delivery may be implemented based on a DASH streaming mechanism (ISO/IEC 23009-1, Dynamic adaptive streaming over HTTP).

The encoding of the sequence 172 with the sequence 171 enables a rendering of the volumetric video.

If the sequence 172 corresponds to a sequence of second images comprising only geometric information, a further sequence of third frames comprising the texture information may be encoded in a same way as the sequence 172.

Figure 18:
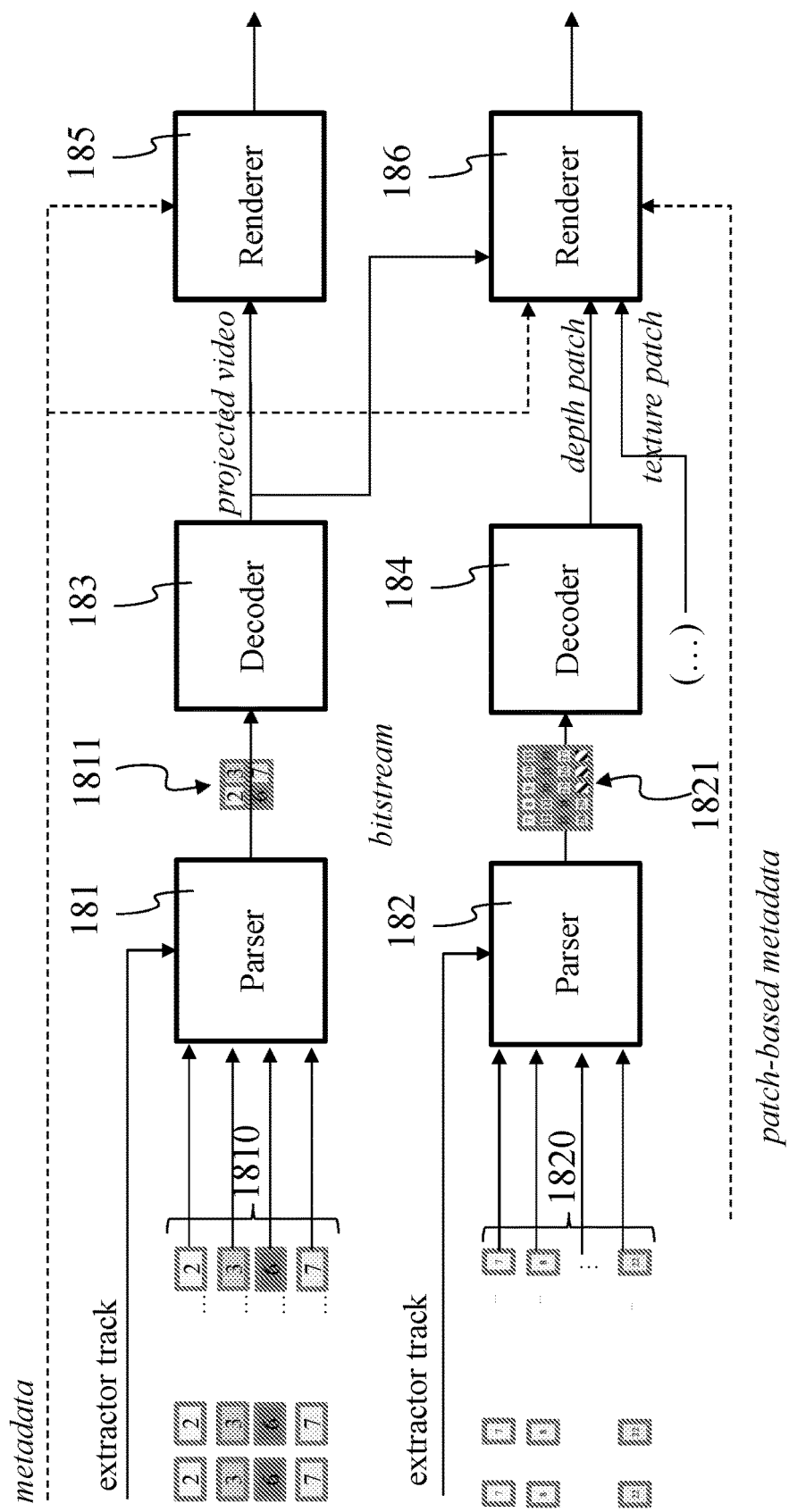
FIG. 18 shows an example of a process to decode the 3D scene of FIG. 1, according to a non-restrictive embodiment of the present principles.

FIG. 18 shows a non-limiting example of a process to decode the bitstream obtained with the encoding process of FIG. 17.

The decoding process comprises two main processes, a first process to decode the data representative of the omnidirectional content (only texture information) for 3 DoF rendering and a second process to decode the data enabling the rendering of the volumetric content for 3 DoF+ rendering.

In the first process, the tile tracks 1810 associated with the requested viewport orientation (tracks comprising the data associated with the first tiles T2, T3, T6 and T7 according to the non-limiting example of FIG. 17) are parsed by a parser 181 according to the instructions received in the extractor track. The parser 181 enables to reconstruct a bitstream 1811 that is compliant with the decoder 183 (e.g. a HEVC compliant bitstream if the decoder 183 is HEVC-compliant or a AV1 compliant bitstream if the decoder 183 is AV1 compliant). Data comprised in the bitstream 1811 is decoded by the decoder 183 and the decoded data is transmitted to a renderer 185 that is configured to render the omnidirectional content using the metadata 1712 comprised in the bitstream obtained with the encoding process of FIG. 17.

In the second process, the tile tracks 1820 associated with the requested viewport orientation (tracks comprising the patches comprised in the second tiles (or third tiles for texture data) associated with the first tiles T2, T3, T6 and T7 according to the non-limiting example of FIG. 17) are parsed by a parser 182 according to the instructions received in the extractor track. The parser 182 enables to reconstruct a bitstream 1821 that is compliant with the decoder 184 (e.g. a HEVC compliant bitstream if the decoder 184 is HEVC-compliant or a AV1 compliant bitstream if the decoder 184 is AV1 compliant). The reconstructed bitstream comprises for example the data of one or more fourth frames described in relation to FIG. 15. Data comprised in the bitstream 1821 is decoded by the decoder 184 and the decoded data is transmitted to a renderer 186 that is configured to render the volumetric part of the volumetric content using the metadata 1722 comprised in the bitstream obtained with the encoding process of FIG. 17. The second process may be performed for tiles tracks comprising depth information and for tiles tracks comprising texture information.

Figure 19:
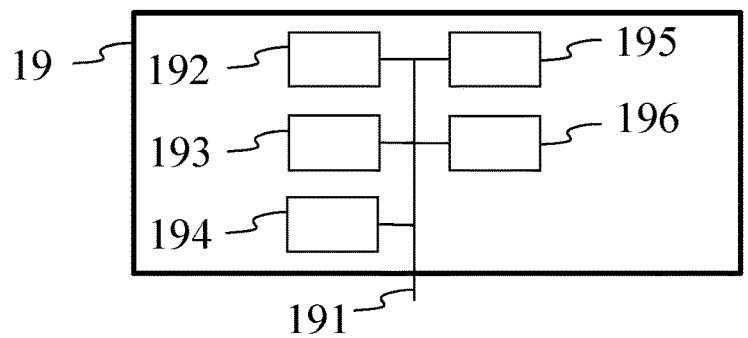
FIG. 19 shows an example architecture of a device which may be configured to implement a method or process described in relation with FIGS. 14, 17, 18, 20 and/or 21, according to a non-restrictive embodiment of the present principles.
Figure 20:
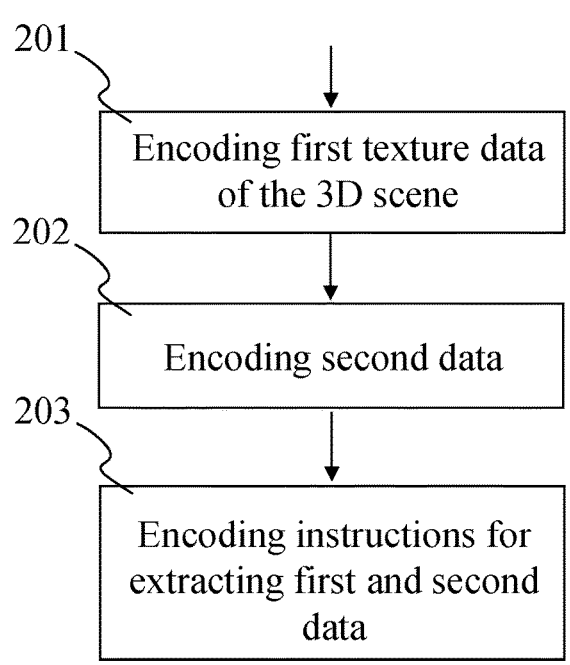
FIG. 20 illustrates an example of a method for encoding data representative of the 3D scene of FIG. 1, implemented for example in the device of FIG. 19, according to a non-restrictive embodiment of the present principles.

FIG. 19 shows an example architecture of a device 19 which may be configured to implement a method described in relation with FIGS. 17, 18, 20 and/or 21. The device 19 may be configured to be an encoder 121 or a decoder 123 of FIG. 12.

The device 19 comprises following elements that are linked together by a data and address bus 191:
- a microprocessor 192 (or CPU), which is, for example, a DSP (or Digital Signal Processor);
- a ROM (or Read Only Memory) 193;
- a RAM (or Random-Access Memory) 194;
- a storage interface 195;
- an I/O interface 196 for reception of data to transmit, from an application; and
- a power supply, e.g. a battery.

In accordance with an example, the power supply is external to the device. In each of mentioned memory, the word «register» used in the specification may correspond to area of small capacity (some bits) or to very large area (e.g. a whole program or large amount of received or decoded data). The ROM 193 comprises at least a program and parameters. The ROM 193 may store algorithms and instructions to perform techniques in accordance with present principles. When switched on, the CPU 192 uploads the program in the RAM and executes the corresponding instructions.

The RAM 194 comprises, in a register, the program executed by the CPU 192 and uploaded after switch-on of the device 19, input data in a register, intermediate data in different states of the method in a register, and other variables used for the execution of the method in a register.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with an example of encoding or an encoder 121 of FIG. 12, the three-dimension scene is obtained from a source. For example, the source belongs to a set comprising:
- a local memory (193 or 194), e.g. a video memory or a RAM (or Random-Access Memory), a flash memory, a ROM (or Read Only Memory), a hard disk;

a storage interface (195), e.g. an interface with a mass storage, a RAM, a flash memory, a ROM, an optical disc or a magnetic support;

a communication interface (196), e.g. a wireline interface (for example a bus interface, a wide area network interface, a local area network interface) or a wireless interface (such as a IEEE 802.11 interface or a Bluetooth® interface); and a user interface such as a Graphical User Interface enabling a user to input data.

In accordance with examples of the decoding or decoder(s) 123 of FIG. 12, the stream is sent to a destination; specifically, the destination belongs to a set comprising:

a local memory (193 or 194), e.g. a video memory or a RAM, a flash memory, a hard disk;

a storage interface (195), e.g. an interface with a mass storage, a RAM, a flash memory, a ROM, an optical disc or a magnetic support; and a communication interface (196), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, WiFi® or a Bluetooth® interface).

In accordance with examples of encoding or encoder, a bitstream comprising data representative of the volumetric scene is sent to a destination. As an example, the bitstream is stored in a local or remote memory, e.g. a video memory or a RAM, a hard disk. In a variant, the bitstream is sent to a storage interface, e.g. an interface with a mass storage, a flash memory, ROM, an optical disc or a magnetic support and/or transmitted over a communication interface, e.g. an interface to a point to point link, a communication bus, a point to multipoint link or a broadcast network.

In accordance with examples of decoding or decoder or renderer 123 of FIG. 12, the bitstream is obtained from a source. Exemplarily, the bitstream is read from a local memory, e.g. a video memory, a RAM, a ROM, a flash memory or a hard disk. In a variant, the bitstream is received from a storage interface, e.g. an interface with a mass storage, a RAM, a ROM, a flash memory, an optical disc or a magnetic support and/or received from a communication interface, e.g. an interface to a point to point link, a bus, a point to multipoint link or a broadcast network.

In accordance with examples, the device 19 is configured to implement a method described in relation with FIGS. 17, 18, 20 and/or 21, and belongs to a set comprising:

a mobile device;
a communication device;
a game device;
a tablet (or tablet computer);
a laptop;
a still picture camera;
a video camera;
an encoding chip;
a server (e.g. a broadcast server, a video-on-demand server or a web server).

FIG. 20 illustrates a method for encoding data representative of a 3D scene, for example the 3D scene 10, according to a non-restrictive embodiment of the present principles. The method may for example be implemented in the encoder 121 and/or in the device 19. The different parameters of the device 19 may be updated. The 3D scene may for example be obtained from a source, one or more points of view may be determined in the space of the 3D scene, parameters associated with projection mapping(s) may be initialized.

In a first operation 201, first data representative of the texture of the 3D scene is encoded or formatted into one or more first tracks of a container or of a file, according to a determined format, for example according to HEVC/H265: "ITU-T H.265 TELECOMMUNICATION STANDARDIZATION SECTOR OF ITU (October 2014), SERIES H: AUDIOVISUAL AND MULTIMEDIA SYSTEMS, Infrastructure of audiovisual services—Coding of moving video, High efficiency video coding, Recommendation ITU-T H.265" or according to AV1. The container corresponds for example to an ISOBMFF (ISO Base Media File Format, ISO/IEC 14496-12-MPEG-4 Part 12) file. The first data refers to the parts (e.g. points or mesh elements) of the 3D scene that are visible according to a single first viewpoint. The first data comprises for example metadata and signaling information pointing to a first syntax element of a bitstream that comprises the texture information encoded into pixels of a first frame, the first frame being partitioned in a plurality of tiles. A 3D part of the 3D scene 10 is associated with each first tile of the first frame 40. Each first track is for example associated with one different first tile and comprises the first data of the associated first tile. The first data, once decoded or interpreted, enables to obtain a 3 DoF representation of the 3D scene according to the first viewpoint, i.e. a representation without parallax.

In a second operation 202, second data representative of depth associated with points of the 3D scene is encoded into one or more second tracks of the container or of the file. The second data is arranged in second tiles of a second frame, which may correspond to the fourth frame 151, 152 of FIG. 15. A different set of second tiles is associated with each first tile and the number of second tiles comprised in the second frame is greater than the number of first tiles of the first frame. Patches of second data (the second data corresponding for example to geometric (depth) information) are arranged in the second tiles and encoded into the corresponding second track, for example according to HEVC or AV1 format. Each patch corresponds to a 2D parametrization of a part (i.e. a group of points) of the 3D scene. The patches obtained by 2D parametrization of a 3D part of the 3D scene associated with a given first tiles are arranged in the second tiles allocated to this first tile. The second data, once decoded or interpreted, enables to obtain a 3 DoF+ representation of the 3D scene according to a plurality of viewports including the first viewpoint, i.e. a representation with parallax.

According to a variant, the patches comprise texture information in addition to the geometric information, except for the patches obtained by considering the first viewpoint. In other words, the second data comprises geometric and texture data.

According to a further variant, the patches comprise only geometric information. According to this variant, one or more additional second frames may be obtained, each additional second frame being partitioned into a plurality of second tiles, the number of second tiles being greater than the total number of first tiles. One or more of the second tiles are associated with each first tile and patches of texture data are arranged in the second tiles and encoded into additional tracks, called fourth tracks. The patches obtained by 2D parametrization of a 3D part of the 3D scene associated with a given first tiles are arranged in the second tiles allocated to this first tile.

In a third operation 204, one or more instructions are encoded in one or more third tracks of the container or of the file. The instructions are adapted to extract first and second data from the first and second tracks and to arrange the extracted first and second data into a bitstream formatted to be decoded by a single decoder. The third track corresponds for example to an extractor track according to HEVC. the second data is encoded into the second frame(s). The number of third tracks is for example equal to the number of number of C possible viewport orientations described in relation to FIG. 17.

According to a further optional variant, the data and instructions of the first, second and third tracks form a bitstream that is transmitted to a decoder or to a renderer comprising a decoder.

Figure 21:
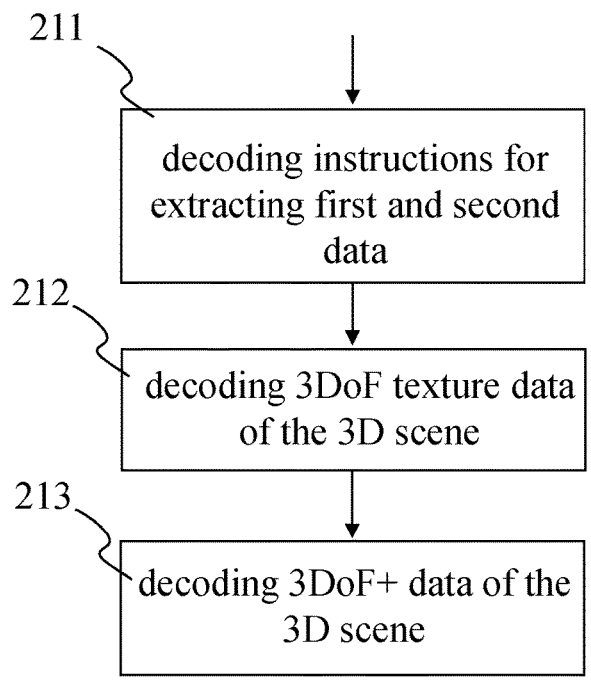
FIG. 21 illustrates a method for decoding data representative of the 3D scene of FIG. 1, implemented for example in the device of FIG. 19, according to a non-restrictive embodiment of the present principles.

FIG. 21 illustrates a method for decoding data representative of a 3D scene, for example the 3D scene 10, according to a non-restrictive embodiment of the present principles. The method may for example be implemented in the decoder 123 and/or in the device 19.

In a first operation 211, one or more instructions are decoded from one or more third tracks of the container or of the file. The instructions are adapted to extract first and second data from the first and second tracks and to arrange the extracted first and second data into a bitstream formatted to be decoded by a single decoder. The third track corresponds for example to an extractor track according to HEVC.

In a second operation 212, the first data representative of the texture of the part of the 3D scene that is visible according to a first viewpoint is decoded or interpreted from first tiles comprised in one or more first tracks, as instructed by the instructions obtained at operation 211. The first data enables to obtain a 3 DoF representation of the 3D scene according to the first viewpoint, i.e. a representation without parallax.

In a third operation 213, the second data representative of the geometry of the 3D scene that is visible according to a set of points of view comprising the first viewpoint is decoded or interpreted from second tiles comprised in one or more second tracks, as instructed by the instructions obtained at operation 211. The second data is comprised in patches obtained by 2D parametrization of groups of points of the 3D scene. According to a variant, third data representative of the texture of the 3D scene that is visible according to said set of viewpoints excluding the first viewpoint is decoded or interpreted from one or more third tiles of additional tracks. The second data with the third data enables to obtain a 3 DoF+ representation of the 3D scene according to said viewpoints, i.e. a representation with parallax.

According to a variant, the decoded first and second data are arranged in a bitstream as instructed by the instructions obtained at operation 211 to form a bitstream to be decoded by a decoder. According to another variant, the obtained bitstream is decoded by a decoder for rendering by a rendered. The rendered content may be displayed on a viewing end-user device such as a HMD, according to a viewport orientation corresponding to the instructions.

Naturally, the present disclosure is not limited to the embodiments previously described.

In particular, the present disclosure is not limited to a method and device for encoding/decoding data representative of a 3D scene but also extends to a method for generating a bitstream comprising the encoded data and to any device implementing this method and notably any devices comprising at least one CPU and/or at least one GPU.

The present disclosure also relates to a method (and a device configured) for displaying images rendered from the decoded data of the bitstream.

The present disclosure also relates to a method (and a device configured) for transmitting and/or receiving the bitstream.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of encoding data representative of a 3D scene, the method comprising:
  encoding, into at least a first track, a first texture image obtained by projecting points of the 3D scene visible from a first viewpoint, the first image being arranged in a plurality of first tiles, a part of the 3D scene being associated with each first tile;
  for each tile:
    obtaining a group of patches, a patch being obtained by projecting a part of points of the part of the 3D scene associated with the first tile on a picture encoding a distance between a second viewpoint and the projected points;
    arranging patches of the group of patches in at least one second tile of a second image, the at least one second tile being associated with the first tile;
  wherein the total number of second tiles of the second image is greater than the total number of first tiles of the first frame;
  encoding the second image into at least a second track,
  encoding, into at least a third track, at least an instruction to extract at least a part of the first image from the first track and at least a part of the second image from the second track.

2. The method according to claim 1, wherein when a size of a patch of the set is greater than a size of a second the into which the patch is to be arranged, then the patch is partitioned into a plurality of sub-patches having each a size less than the size of the second tile.

3. The method according to claim 1, wherein patches of the set are arranged with a priority order depending on a visual importance of the patches, the visual importance depending on the depth data associated with the patches.

4. The method according to claim 1, wherein the second tiles have a same size that is fixed for a plurality of temporally successive second images.

5. A non-transitory processor readable medium having stored therein instructions for causing a processor to perform at least the steps of the method according to claim 1.

6. The method according to claim 1, wherein the patches are obtained by projecting a part of points of the part of the 3D scene associated with the first tile on a picture encoding depth data and texture data of the projected points.

7. The method according to claim 1, further comprising:
  for each first tile:
    obtaining a group of patches, a patch being obtained by projecting a part of points of the part of the 3D scene associated with the first tile on a picture encoding texture data of the projected points;
    arranging patches of the group of patches in at least one third tile of a third image; and
  encoding the third image in at least a fourth track.

8. A device configured to encode data representative of a 3D scene, the device comprising a memory associated with at least one processor configured to:
  encode, into at least a first track, a first texture image obtained by projecting points of the 3D scene visible from a first viewpoint, the first image being arranged in a plurality of first tiles, a part of the 3D scene being associated with each first tile;
  for each tile:
    obtain a group of patches, a patch being obtained by projecting a part of points of the part of the 3D scene associated with the first tile on a picture encoding a distance between a second viewpoint and the projected points;
    arrange patches of the group of patches in at least one second tile of a second image, the at least one second tile being associated with the first tile;
    wherein the total number of second tiles of the second image is greater than the total number of first tiles of the first frame;
  encode the second image into at least a second track; and
  encode, into at least a third track, at least an instruction to extract at least a part of the first image from the first track and at least a part of the second image from the second track.

9. The device according to claim 8, wherein when a size of a patch of the set is greater than a size of a second tile into which the patch is to be arranged, then the patch is partitioned into a plurality of sub-patches having each a size less than the size of the second tile.

10. The device according to claim 8, wherein patches of the set are arranged with a priority order depending on a visual importance of the patches, the visual importance depending on depth data associated with the patches.

11. The device according to claim 8, wherein the second tiles have a same size that is fixed for a plurality of temporally successive second images.

12. The device according to claim 8, wherein the patches are obtained by projecting a part of points of the part of the 3D scene associated with the first tile on a picture encoding depth data and texture data of the projected points.

13. The device according to claim 8, further comprising:
  for each first tile:
    obtaining a group of patches, a patch being obtained by projecting a part of points of the part of the 3D scene associated with the first tile on a picture encoding texture data of the projected points;
    arranging patches of the group of patches in at least one third tile of a third image; and
  encoding the third image in at least a fourth track.

14. A method of decoding data representative of a 3D scene, the method comprising:
  decoding, from at least a third track, at least an instruction to extract a first image from at least a first track and a second image from at least a second track;
  decoding the first image, the first image being obtained by projecting points of the 3D scene visible from a first viewpoint, the first image being arranged in a plurality of first tiles, a part of the 3D scene being associated with each first tile; and decoding the second image, the second image being arranged in a plurality of second tiles, a second tile being associated with a first tile and comprising patches, a patch of a second tile being obtained by projecting a part of points of the part of the 3D scene associated with the first tile associated with the second tile on a picture encoding a distance between a second viewpoint and the projected points.

15. The method according to claim 14, wherein at least a part of the 3D scene is rendered according to the first and second images.

16. A non-transitory processor readable medium having stored therein instructions for causing a processor to perform at least the steps of the method according to claim 14.

17. The method according to claim 14, wherein the patches are obtained by projecting a part of points of the part of the 3D scene associated with the first tile on a picture encoding depth data and texture data of the projected points.

18. The method according to claim 14, further comprising decoding a third image from at least a third track, the third image being arranged in a plurality of third tiles, a third tile being associated with a first tile and comprising patches, a patch of a third tile being obtained by projecting a part of points of the part of the 3D scene associated with the first tile associated with the third tile on a picture encoding texture data of the projected points.

19. A device configured for decoding data representative of a 3D scene, the device comprising a memory associated with at least one processor configured to:
   decode, from at least a third track, at least an instruction to extract a first image from at least a first track and a second image from at least a second track;
   decode the first image, the first image being obtained by projecting points of the 3D scene visible from a first viewpoint, the first image being arranged in a plurality of first tiles, a part of the 3D scene being associated with each first tile; and
   decode the second image, the second image being arranged in a plurality of second tiles, a second tile being associated with a first tile and comprising patches, a patch of a second the being obtained by projecting apart of points of the part of the 3D scene associated with the first tile associated with the second tile on a picture encoding a distance between a second viewpoint and the projected points.

20. The device according to claim 19, wherein at least a part of the 3D scene is rendered according to the first and second images.

21. The device according to claim 19, wherein the patches are obtained by projecting a part of points of the part of the 3D scene associated with the first tile on a picture encoding depth data and texture data of the projected points.

22. The device according to claim 19, further comprising decoding a third image from at least a third track, the third image being arranged in a plurality of third tiles, a third tile being associated with a first tile and comprising patches, a patch of a third tile being obtained by projecting a part of points of the part of the 3D scene associated with the first tile associated with the third tile on a picture encoding texture data of the projected points.

23. A non-transitory processor readable medium having stored data representative of a 3D scene, the data comprising, in at least a first track, a first texture image obtained by projecting points of the 3D scene visible from a first viewpoint, the first image being arranged in a plurality of first tiles, a part of the 3D scene being associated with each first tile; in at least a second track, a second image arranged in a plurality of second tiles, a second tile being associated with a first tile and comprising patches, a patch of a second tile being obtained by projecting a part of points of the part of the 3D scene associated with the first tile associated with the second tile on a picture encoding a distance between a second viewpoint and the projected points; and in at least a third track, at least an instruction to extract the first image from the first track and the second image from the second track.

* * * * *

UNITED STATES PATENT AND TRADEMARK OFFICE
CERTIFICATE OF CORRECTION

PATENT NO. : 11,178,383 B2  
APPLICATION NO. : 17/043504  
DATED : November 16, 2021  
INVENTOR(S) : Julien Fleureau et al.

Page 1 of 1

It is certified that error appears in the above-identified patent and that said Letters Patent is hereby corrected as shown below:

In the Claims

Column 29, Line 42: replace "track," with -- track; and --

Column 29, Line 48: replace "second the" with -- second tile --

Column 32, Line 1: replace "second the" with -- second tile --

Column 32, Line 2: replace "apart" with -- a part --

Signed and Sealed this  
Twelfth Day of April, 2022

Drew Hirshfeld  
*Performing the Functions and Duties of the*  
*Under Secretary of Commerce for Intellectual Property and*  
*Director of the United States Patent and Trademark Office*